US012696915B2

(12) United States Patent
Baarman et al.

(10) Patent No.: US 12,696,915 B2
(45) Date of Patent: Aug. 4, 2026

(54) DYNAMIC POWER APPLIANCE FOR CONTAINERS, PACKAGES AND VESSELS METHOD AND SYSTEM

(71) Applicant: HOLLYMATIC CORPORATION, Countryside, IL (US)

(72) Inventors: David W. Baarman, Fennville, MI (US); Benjamin C. Moes, Wyoming, MI (US)

(73) Assignee: HOLLYMATIC CORPORATION, Countryside, IL (US)

( * ) Notice: Subject to any disclaimer, the term of this patent is extended or adjusted under 35 U.S.C. 154(b) by 222 days.

(21) Appl. No.: 17/137,582

(22) Filed: Dec. 30, 2020

(65) Prior Publication Data

US 2021/0267023 A1 Aug. 26, 2021

Related U.S. Application Data

(60) Provisional application No. 62/956,996, filed on Jan. 3, 2020.

(51) Int. Cl.
| | |
|---|---|
| *A23L 5/10* | (2016.01) |
| *A47J 27/00* | (2006.01) |
| *A47J 36/32* | (2006.01) |
| *G01J 5/10* | (2006.01) |
| *G06V 10/75* | (2022.01) |

(Continued)

(52) U.S. Cl.
CPC *A23L 5/10* (2016.08); *A23L 5/15* (2016.08); *A47J 27/004* (2013.01); *A47J 36/32* (2013.01); *G01J 5/10* (2013.01); *G06V 10/75* (2022.01); *H05B 6/06* (2013.01); *H05B 6/065* (2013.01); *H05B 6/1272* (2013.01); *A23V 2002/00* (2013.01); *H05B 2213/05* (2013.01); *H05B 2213/07* (2013.01)

(58) Field of Classification Search
CPC ... A23L 5/10; A23L 5/15; A47J 27/004; A47J 36/32; A23V 2002/00; G06V 10/75; G01J 5/10; H05B 6/06; H05B 6/065; H05B 6/1272; H05B 2213/05; H05B 2213/07
USPC ......................................................... 219/600
See application file for complete search history.

(56) References Cited

U.S. PATENT DOCUMENTS

| | | | | |
|---|---|---|---|---|
| 3,431,382 A | * | 3/1969 | Esche | H05B 6/06 219/650 |
| 6,107,613 A | * | 8/2000 | Welch | H05B 6/103 219/646 |

(Continued)

FOREIGN PATENT DOCUMENTS

WO WO-2018183574 A1 * 10/2018 .......... A47J 31/4492

*Primary Examiner* — Elizabeth M Kerr
*Assistant Examiner* — Simpson A Chen
(74) *Attorney, Agent, or Firm* — Sughrue Mion, PLLC

(57) ABSTRACT

A dynamic container, package and vessel heating method with monitoring and safety system. The system includes identification detection and sensors to detect and authenticate the proper container, package or vessel. The system is capable of adjusting the driver for optimized induction heating of the target container, package or vessel. It is connected to a cloud based system that provides appliance specific and package specific drive and control details based on the identifier. The cloud based platform monitors point of consumption data and enables user marketing consumption of data while also enabling consumption driven feedback from the user.

17 Claims, 24 Drawing Sheets

(51) Int. Cl.
  *H05B 6/06*     (2006.01)
  *H05B 6/12*     (2006.01)

(56)      References Cited

U.S. PATENT DOCUMENTS

| | | | |
|---|---|---|---|
| 2003/0047559 A1* | 3/2003 | Watanabe | H05B 6/6455 |
| | | | 219/754 |
| 2015/0245421 A1* | 8/2015 | Heczko | H05B 6/1245 |
| | | | 99/323.3 |
| 2018/0093814 A1* | 4/2018 | Espinosa | A23L 3/28 |
| 2018/0227987 A1* | 8/2018 | Fontaine | H05B 6/44 |
| 2018/0292092 A1* | 10/2018 | Bhogal | F24C 7/087 |
| 2019/0104572 A1* | 4/2019 | Clark | G06K 19/07758 |

* cited by examiner

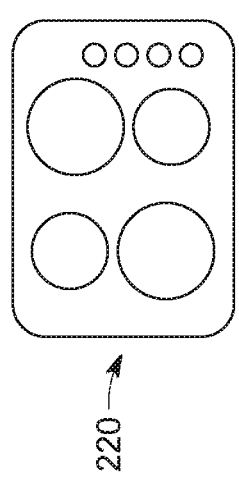
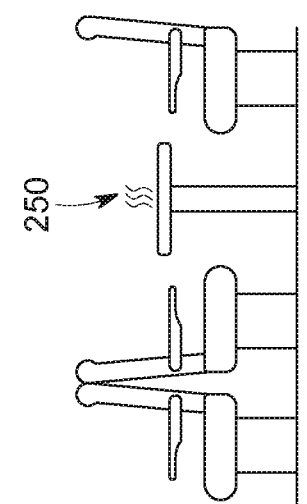
220
250
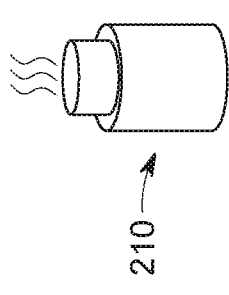
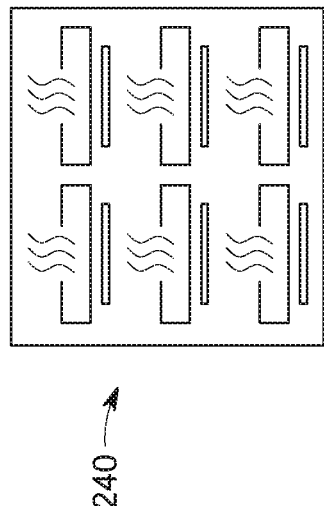
210
240
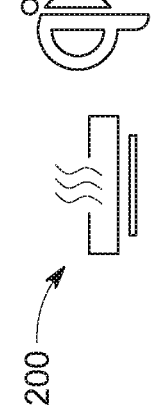
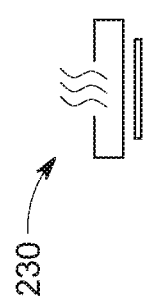
200
230
FIG. 2

Figure 7

| Can | UPC | Volume (mL) | Frequency (kHz) | Voltage | Target Current (A) | Target Power (W) | Target Heating Time (s) |
|---|---|---|---|---|---|---|---|
| Georgia Gotica | 8801094582203 | 265 | 39 | 80 | 11.5 | 920 | 39.7 |
| Emerald Mountain | 4902102107341 | 185 | 39 | 82 | 11.5 | 943 | 27.1 |
| Duncan Shot in the Dark Vanilla | 0490000076073 | 239 | 39 | 82 | 12 | 984 | 33.5 |
| Duncan Shot in the Dark Carmel | 0490000077506 | 239 | 39 | 82 | 12 | 984 | 33.5 |
| Duncan Shot in the Dark Chocolate | 0490000076056 | 239 | 39 | 82 | 12 | 984 | 33.5 |
| Georgia Original | 8801094503000 | 240 | 39 | 82 | 12 | 984 | 33.6 |
| De Hong Pao tea | 9555589210711 | 300 | 41 | 95 | 12 | 1020 | 40.6 |
| Ayataka tea | 8888802119072 | 300 | 41 | 85 | 12 | 1020 | 40.6 |
| Minute Maid OJ | 6956416200012 | 310 | 41 | 85 | 12 | 1020 | 41.9 |
| Georgia Vintage black | 8801094547103 | 270 | 47 | 90 | 11.5 | 1035 | 36.0 |
| Georgia Vintage Vanilla | 8801094577100 | 270 | 47 | 90 | 11.5 | 1035 | 36.0 |
| Hazelnut steel can? | 6970234051519 | 240 | 33 | 100 | 9 | 900 | 36.8 |
| Georgia Red steel can | 6956416203437 | 220 | 32 | 100 | 9 | 900 | 33.7 |

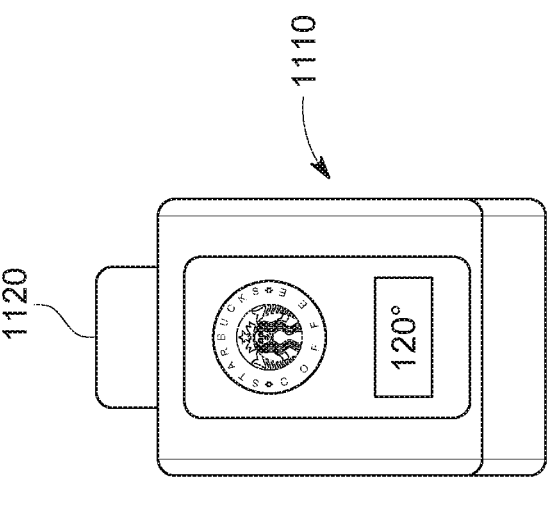
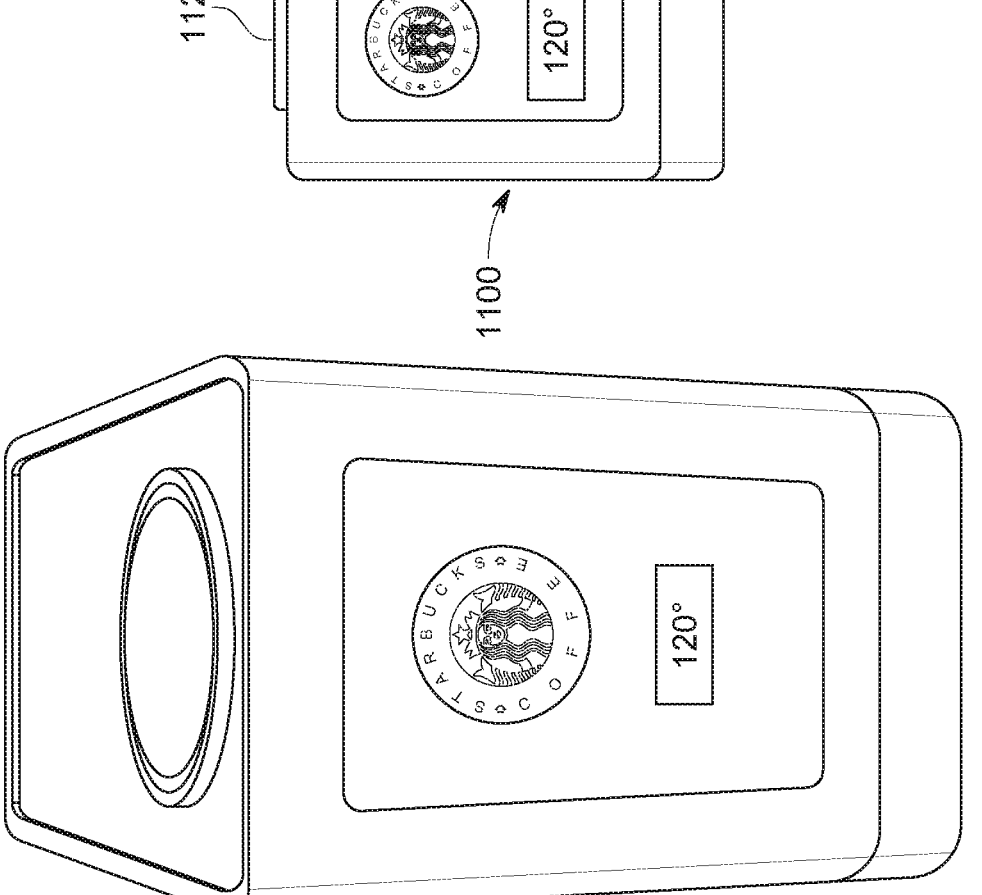
FIG. 11

1

DYNAMIC POWER APPLIANCE FOR CONTAINERS, PACKAGES AND VESSELS METHOD AND SYSTEM

BACKGROUND OF THE INVENTION

The present disclosure generally relates to various ways to provide power to containers or packages.

Past solutions range from limiting materials to fixed configurations. The electrical and mechanical limits of past inductive heating devices are used for specific control and specific container types. Varying materials, sizes, and shapes impact induction heating greatly, which impacts the accuracy of control. Other systems require specific materials and configurations to function properly. Past solutions utilize a typical inductive driver that limits the interaction of the user and functional control. Although these can be helpful solutions for heating, they lack the control, automation, safety, and interactive convenient usage.

Past solutions are not designed for ease of interaction and typically are not designed for intelligent automated interaction. By automating the system, we can create a faster and more controlled heating solution for better customer satisfaction and safety. Heating these containers, packages, or vessels with past induction heating methods would not provide the variability of control to heat and cook at the speeds of this device. These types of variations using prior solutions would be much slower to heat and would not have the additional safety features at the same time.

SUMMARY OF THE INVENTION

Some embodiments provide several solutions to past problems that have been observed and modified for better results in the production environment. The use of infrared sensors, cameras, and cloud interface communications to identify and enable a dynamic set of configuration data for each heating appliance becomes highly versatile and results in safer heating for automated operation. Past solutions did not have the ability to heat sealed containers or packages as effectively. Additionally, many past control systems did not have a way to effectively measure the temperature of the container or package for a closed loop heating solution. One effective monitoring method includes sensing infrared container or package temperature, surface temperature, coil temperature, power to the coil, frequency, and/or systems for identifying the barcode and/or container or package image/graphic.

Although some of the elements described in this disclosure relate to these past embodiments, this disclosure is set to enable a safer, more reliable solution with more options for future appliance configurations enabling the ecosystem.

Various embodiments of the present invention, including for example a dynamic power appliance, address one or more of the following issues: (1) providing the proper power to many package types and materials from multiple types of inductive heating coils; (2) using an analog ping, a digital read and a thermal ping to authenticate and control a package thermal and power profile; (3) using container or package temperature, identification, and thermodynamic profile to control and limit power safely and authenticate package and usage; (4) point of consumption triggers for marketing and feedback; (5) a multi-segment fast heating appliance for containers and packages; (6) creating safe operating profiles related to container volume; (7) using package ID and cloud marketing network to enable content and marketing data to be used while heating and consumption; (8) non-contact measurement and placement; (9) determining and controlling power of a multi-segment coil based on fluid levels; (10) utilizing imaging, infrared and barcode or RFID to determine and control power to a container or package; (11) utilizing mobile imaging and infrared to determine and control power to a container or package based on interface; (12) adjusting dynamically to a container of package type; and/or (13) adjustable coil(s) and moving container or package interface.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 2 shows an ecosystem of a single use lower power product; a high power appliance for fast heating; a range surface for adapted heating and control; a higher power single unit; a stacked multiple cooking unit for delivery, take out or restaurant solution; and a mass transportation/at-table solution.

FIG. 7 shows a series of exemplary products and some basic operating information.

FIG. 11 shows a configuration to allow exposed area for various sized containers or packages while allowing easy access.

DESCRIPTION OF THE CURRENT EMBODIMENTS

Figure 1:
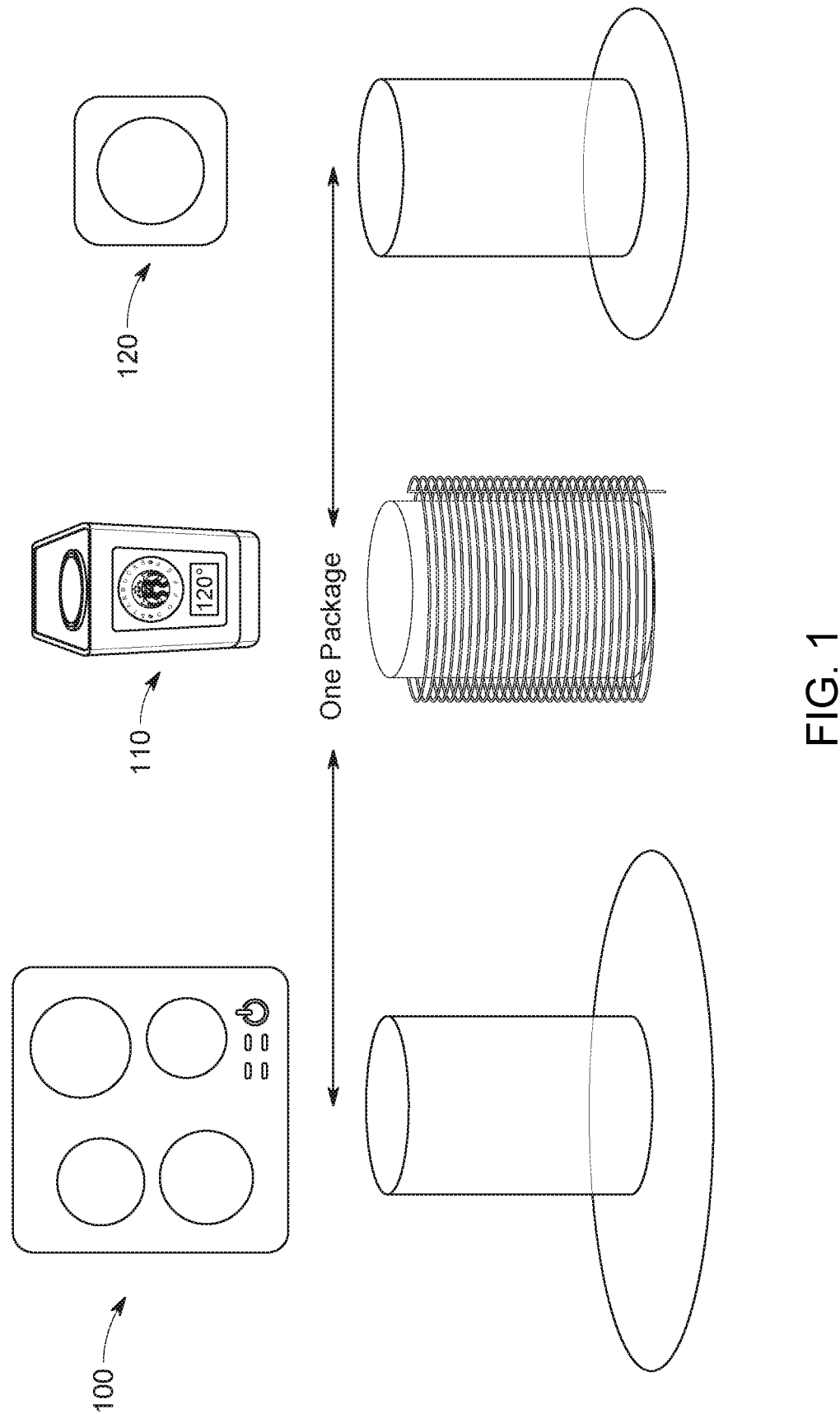
FIG. 1 illustrates an inductive range, an inductive high power specific geometry heating device, and a pad.

FIG. 1 illustrates three appliances including an inductive range 100, an inductive high power specific geometry heating device 110, and a pad 120. The inductive range 100 is high power and can accommodate various sizes of a container, package, or vessel. The inductive high power specific geometry heating device 110 accommodates optimized sizes of a container, package, or vessel. The pad 120 is low power and can accommodate smaller sizes of a container, package, or vessel. Each appliance respectively gathers operational parameters from the cloud or radio frequency identification ("RFID") using an identifier or an RFID protocol. Each appliance heats a target container according to the appliance programming. It should be understood that throughout this disclosure a container can refer to essentially any container, package, vessel, or other item that contains food, beverage, or other consumable matter.

FIG. 2 shows an ecosystem of several power delivery methods according to different embodiments of the present disclosure. The ecosystem includes a single use lower power product 200; a high power appliance for fast heating 210; a range surface for adapted heating and control 220; a higher power single unit 230; a stacked multiple cooking unit 240; and a mass transportation and at table operation unit 250. The single use lower power product 200 can provide heating or Qi charging, and is operable at multiple power levels. The high power appliance for fast heating 210 in one embodiment can be used to heat fluids. The range surface for adapted heating and control 220 utilizes high power induction coils. The high power single unit 230 is operable at multiple power levels. The stacked multiple cooking unit 240 has multiple interconnected induction coils. In one embodiment, the stacked multiple cooking unit 240 can be used for delivery, take out, or restaurant processing. The table operation unit 250 is an appliance integrated into a table for home, retail, and/or transportation uses.

Figure 3:
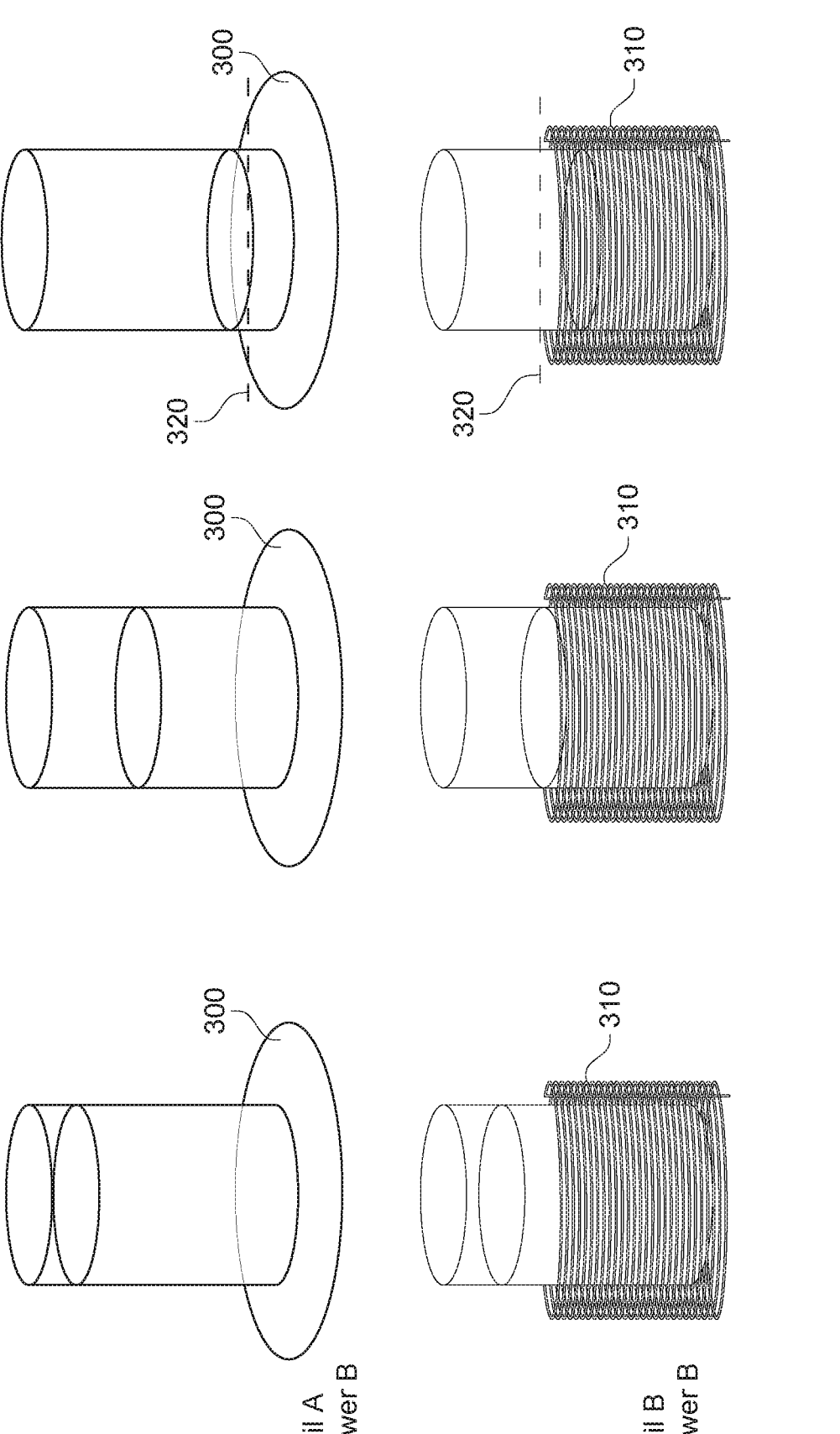
FIG. 3 depicts a configuration of planar and spiral wound coils and safe operating zones for heating sealed packages.

In FIG. 3, a configuration of planar coils 300 and a configuration of spiral wound coils 310 and a volumetric based operating zone 320 for heating sealed packages 312 is shown. If the volumetric level in the sealed package 312 is above the volumetric based operating zone 320, then a controller can be configured to apply power to coil A 300 or coil B 310 in order to heat the package 312. If the volumetric level in the sealed package 312 is below the volumetric-based operating zone 320, then the processor can be configured to cease applying power to coil A 300 and/or coil B 310 in order to avoid overheating the contents of the package and/or the package 312 itself. In some embodiments, the system or a controller in the system may change the configuration of the coils or the amount of power applied to the coils in order to apply a smaller amount of power to the sealed package to allow for safe operation. Multi-segment coils can be utilized and configured to allow the suitable surface area and power levels for time to target heating based on fluid levels (i.e., volumetric levels) within a given container or package type.

Safe operating profiles related to container volume can be created. This may include predefined, preset safety limits of the container or package and user configurable limits within an operating range. The system may be monitoring and using that range for control and safety reporting within the authentication parameters.

Figure 14:
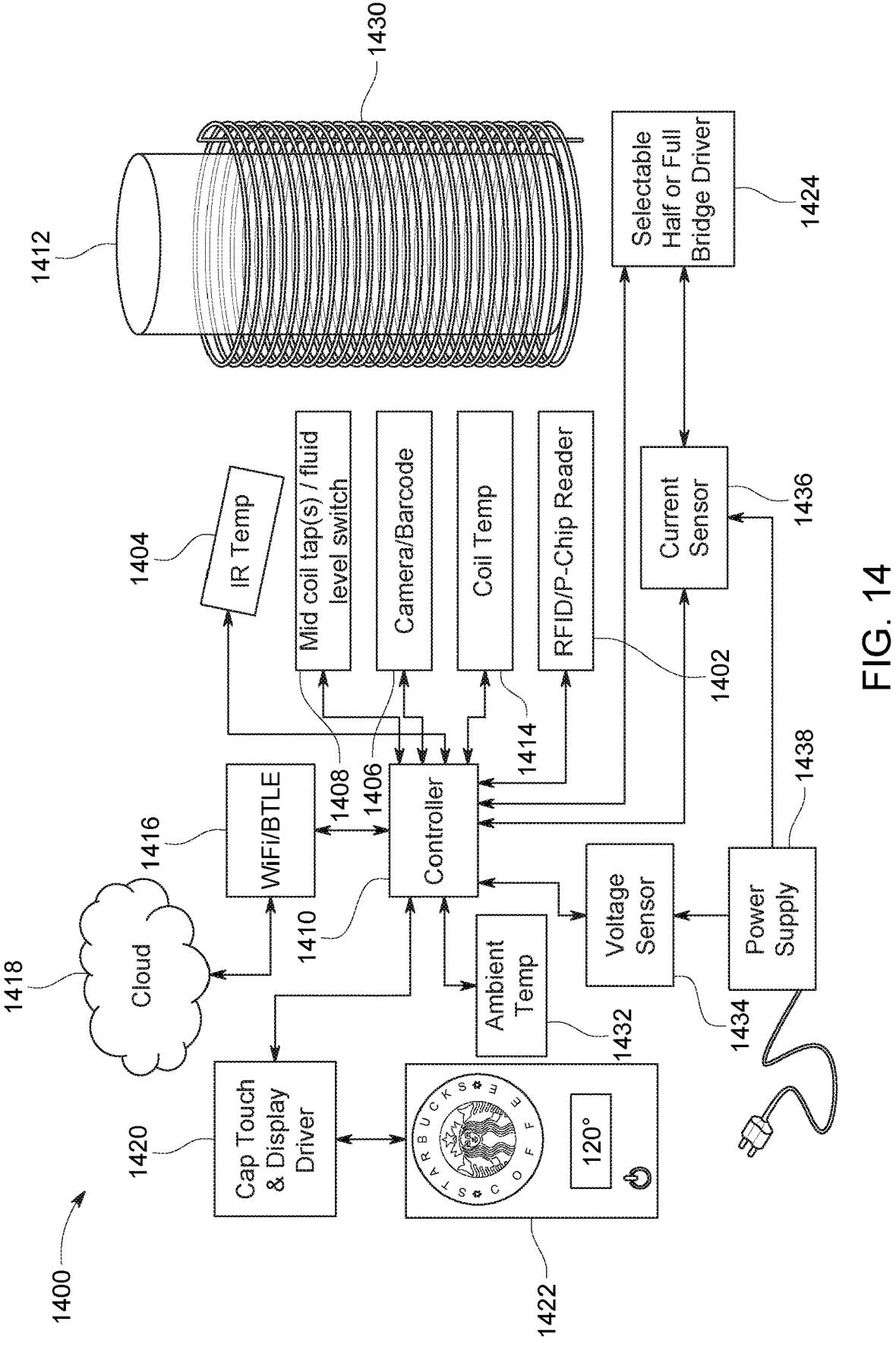
FIG. 14 shows a heating system according to one embodiment using a controller with RFID or P-Chip reading, an infrared sensing, and a PWM driver with phase, frequency, and duty cycle control.

In one embodiment, the system is a multi-segment fast heating appliance for containers and packages. Past systems use singular driving methods and do not allow for the complexities discussed in this disclosure. For example, the system disclosed herein can identify a container or package, and then can use its profile to determine if the container or package is heating as expected. If the container or package is heating faster than expected, the system can use physics to calculate the volumetric level of the container or package. Determining the volumetric level of the container or package can be used to reduce the amount of power applied to the package to prevent side wall heating. Side wall heating is a condition where the fluids are not present, so the inductive coil and energy heat the surface higher than expected because the fluid does not remove the energy. If the system checks the profile quickly for a safe time period, the system can determine the fluid level and either decrease the power level for that volume or adjust the coil segments to be located below the fluid level which enables faster heating for that fluid volume. The segmented coil having mid coil taps is shown in FIG. 14. The depicted coil is representative of a segmented cylinder type coil, however in alternative embodiments a planar type coil may be included in addition or in alternative to the segmented cylinder type coil.

Combinations of both cylinder and planar type coils can be used to more precisely apply high levels of power for fast heating. This can be further enhanced by utilizing combinations of segments of cylinder and planar type coils. This method also allows these segments to be used for packages of various sizes. The data provided by looking up the package identifier or the package identifier contained within the RFID provides this size information for better determining the field size of area required for that heating profile.

Figure 4:
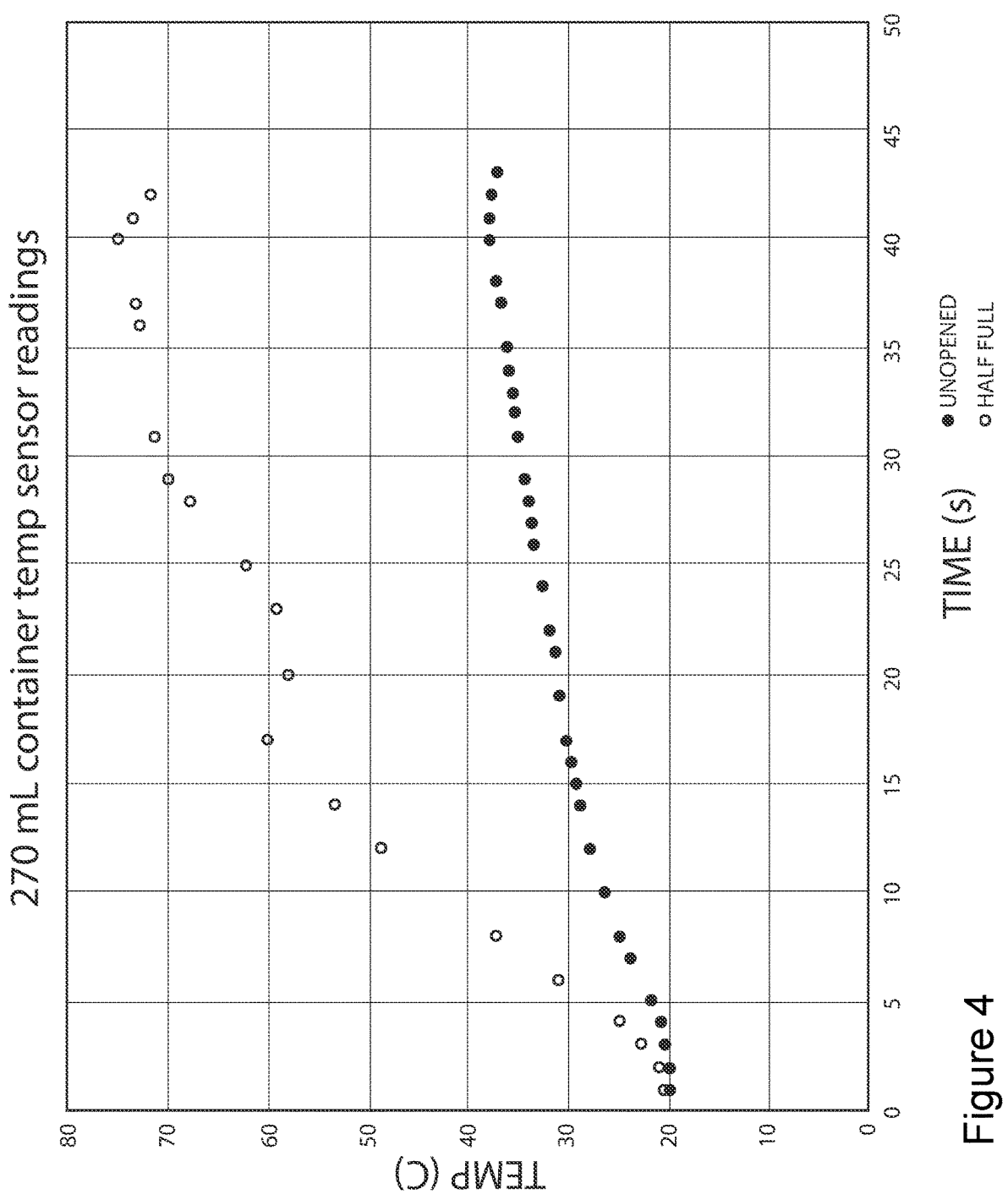
FIG. 4 is a plot of temperature over time of a full 270 mL container and a half full 270 mL container.

FIG. 4 shows a plot of temperature over time of a full 270 mL container and a half full 270 mL container. This illustrates the need to determine the fluid volume in the container in order to ensure the system operates safely. The half full container is at a higher temperature than the full container for the full time range of the plot. Using FIG. 4, a time can be chosen to check the temperature of the container when the container will not be at an unsafe temperature no matter how full it is. The system can then check the temperature of the container at that time and compare it to the expected temperature based on the information received from the cloud or RFID. If the container is heating faster than expected for an unopened container, the system can determine how full the container is by interpolating between the unopened and half full curves. Once the system determines the volume of fluid in the container, the system can adjust the power applied to the container accordingly such that the container does not heat above the safe temperature for that container.

It should be noted that the package may not be heating as expected for reasons other than the volume of the package. For example, the ambient temperature of the room. The system can adjust to an unexpected heating response regardless of the reason for the unexpected result.

Figure 5:
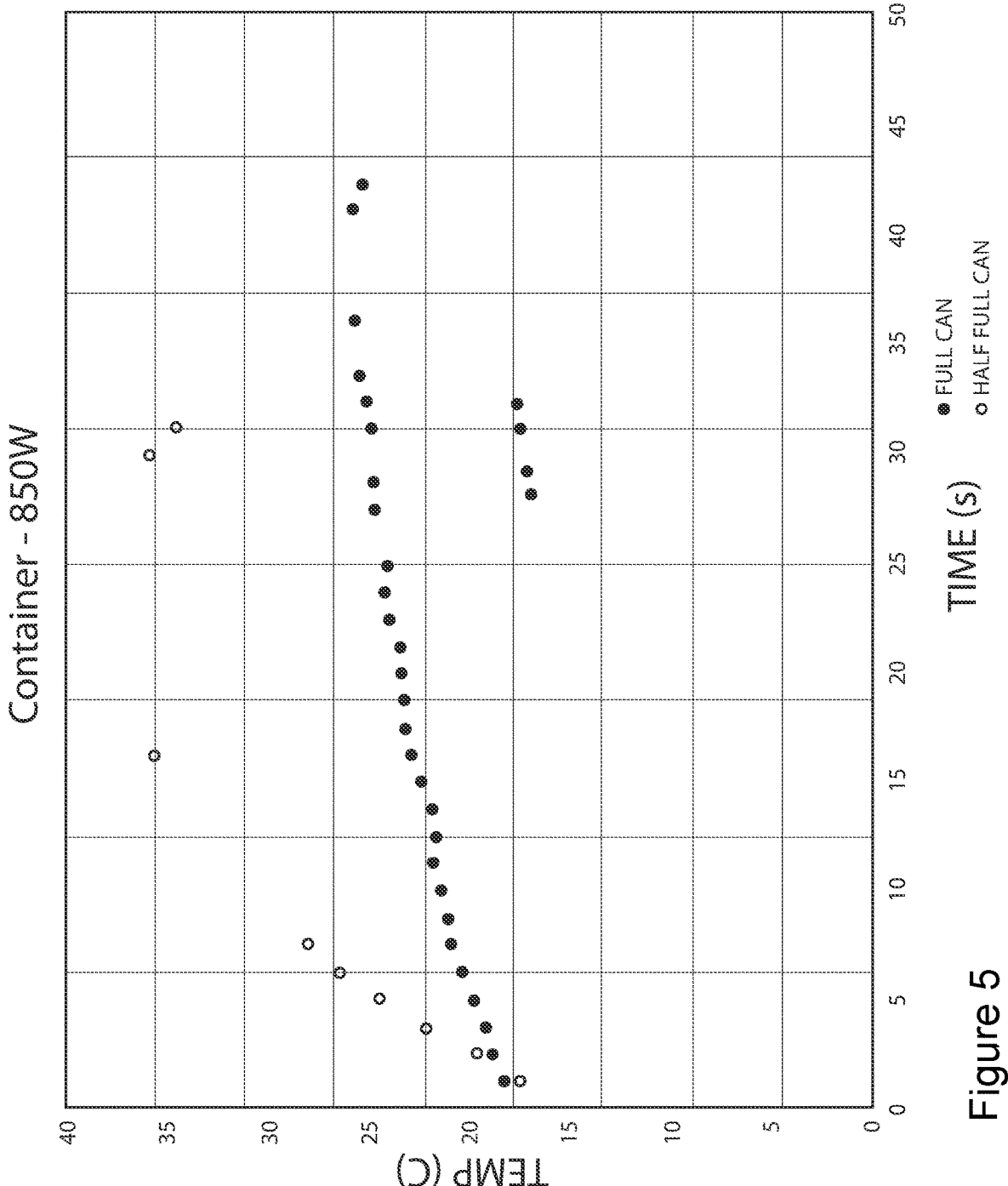
FIG. 5 is a plot of temperature over time of 850 Watts being applied to a full and a half full container.

FIG. 5 shows a plot of temperature over time of 850 Watts being applied to a full container and a half full container. The half full container consistently has a higher temperature than the full container after the first reading. This figure illustrates the half full container will get hotter than is expected if the volume in the container is not determined and the power level is not adjusted accordingly.

Figure 6:
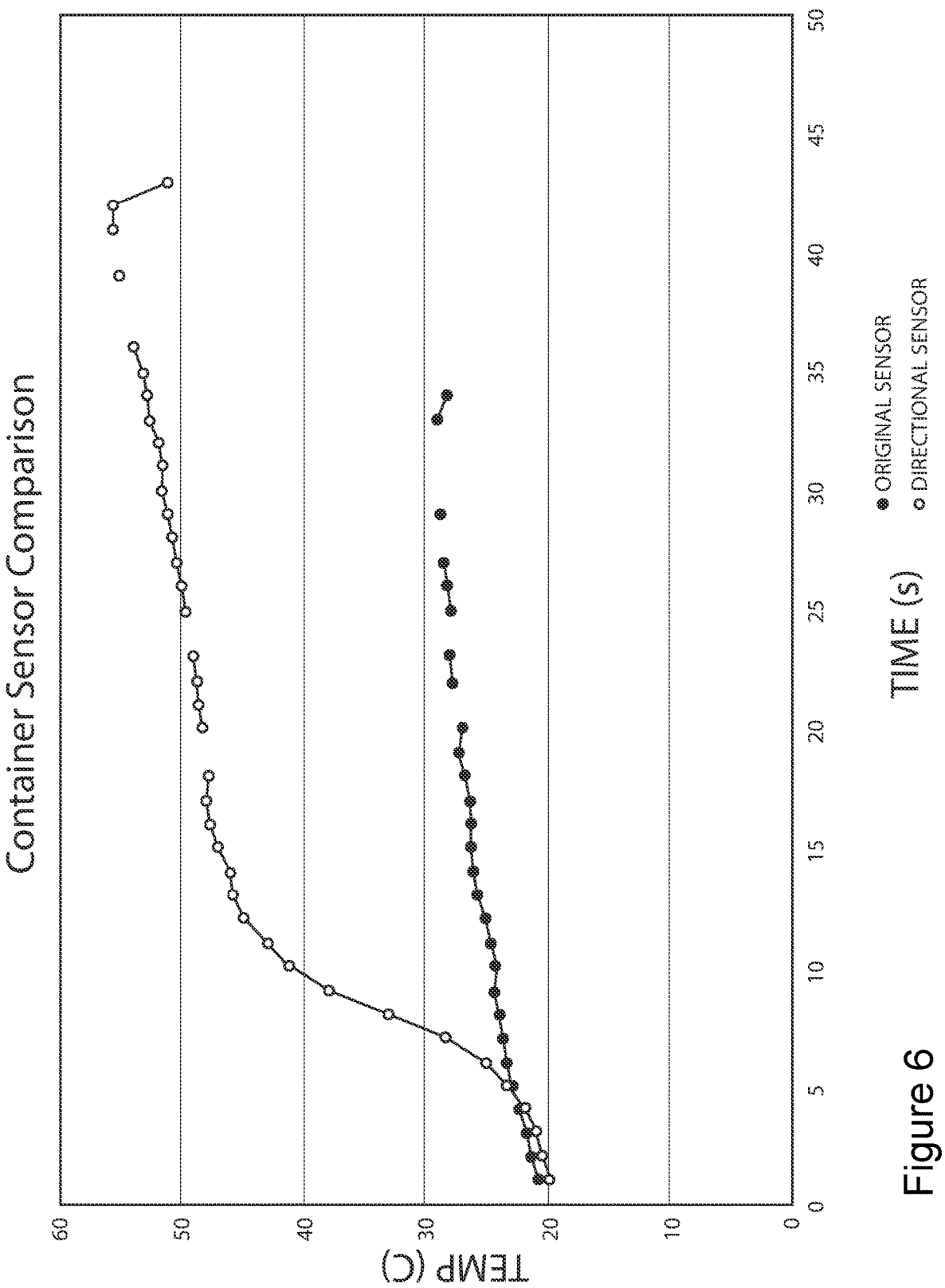
FIG. 6 is one embodiment of a difference in temperature over time between a directional focused non-contact infrared sensor and a standard wide-angle non-contact infrared sensor.

FIG. 6 shows the difference between a directional focused non-contact infrared sensor and a standard wide-angle non-contact infrared sensor. The temperature obtained from each sensor is plotted over time. The wide-angle non-contact sensor consistently shows a lower temperature than the directional sensor. Therefore, the placement of the IR sensor is important for the system to be able to be responsive to the overall temperature rise. The fluid thermal dynamics can change over time as the equilibration and entropy are part of the time to temperature given a thermal mass to heat. By understanding a response curve for a container or package, the system can direct the sensor to that area. For example, the IR sensor can be directed toward where the field lines are strongest which allows the IR sensor to measure the hottest portion of the package.

With reference to FIG. 6, the system allows for non-contact measurement and placement. The IR sensor and placement can impact thermodynamic sensing. The temperature sensor may be placed in an area that would be suitable for thermal transfer but not directly part of the heating. This enables reading of the heating and determining proper target temperatures. Measuring between the transfer zone and the equilibration zone allows the system to see fast change without requiring full equilibration which allows the system track change over time effectively.

In one embodiment, the system uses container or package temperature, identification, and thermodynamic profile to control and limit power safely and to authenticate the package and usage. The system may use an infrared temperature sensor to remotely monitor the package temperature. The container of package can be identified using bar code reading, package graphic recognition, and package inductive profiling. A camera can be used both to read bar codes and perform graphic recognition. Additionally or alternatively, separate inputs and sensors can be used for redundancy. The IR sensor can use an inductive field resistant solution, e.g., shielded, with a remote monitoring non-contact method that is consumer friendly. In one embodiment, the container or package is designed to have specific areas for monitoring temperature on the container or package to enhance the accuracy of the IR reader. An appropriately selected sensor can allow very good accuracy if slightly angled on almost any surface. The identification method can be used to look up the thermodynamic profile for that identifier while using the IR sensor and surface temperature sensors to validate the heating process and profile.

In FIG. 7, a series of products and some basic operating information for these products is shown. In one embodiment, this information is stored in the cloud and is retrieved by the system upon scanning a bar code on the device. Additionally or alternatively, this information may be stored in an RFID tag on the container, package, or vessel and is received by the system upon scanning the RFID tag. The operating information provided allows the system to authenticate the product and to determine the expected heating response of the container, package, or vessel.

Figure 8:
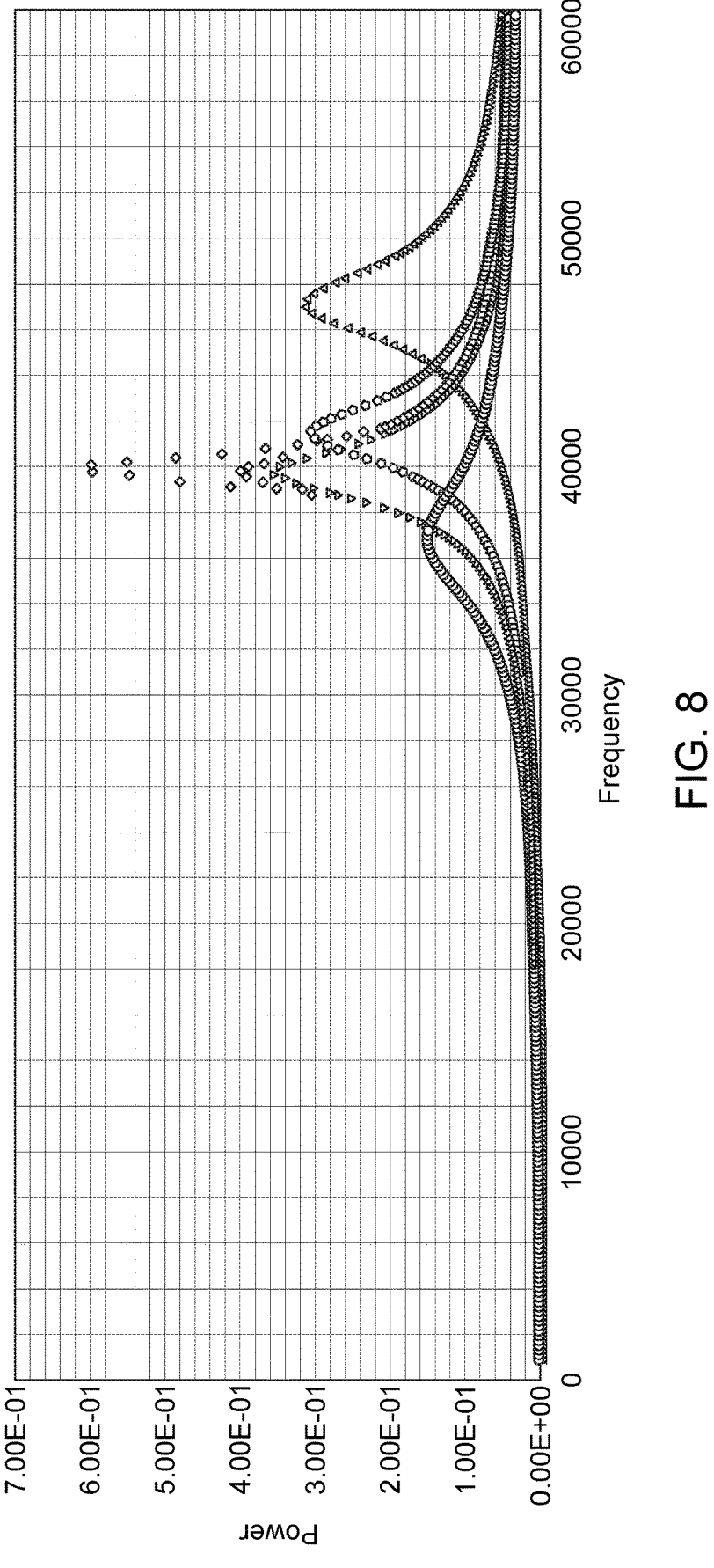
FIG. 8 shows power over frequency response curves for exemplary products.

FIG. 8 shows the response curves for the products listed in FIG. 7 of power over frequency. These curves define the operating range and analog ping frequencies because the curves define the operating range and amplitude of the system. The control system uses this curve to also validate coupling, operational awareness, and authentication. For example, the product can be authenticated by comparing the response curve observed by the system to the expected response curve for that product. If the observed and expected response curves are the same, then the product is authenticated.

The system can adjust dynamically to a container or package type. The profile curves for a given container or package can be based on its power over frequency for each coil solution and each container or package type. The profile curves can be stored locally in memory or remotely in a server or other database. Understanding these curves allows the system to know how much power can be applied to that container or package. However, misalignment, variances, and component tolerances can force a level of dynamic micro adjustments to enable maximum power in specific cases. The safety limits for that identifier can also include how close to resonance or where on the curve each of these identifiers operate for each configuration.

Figure 9:
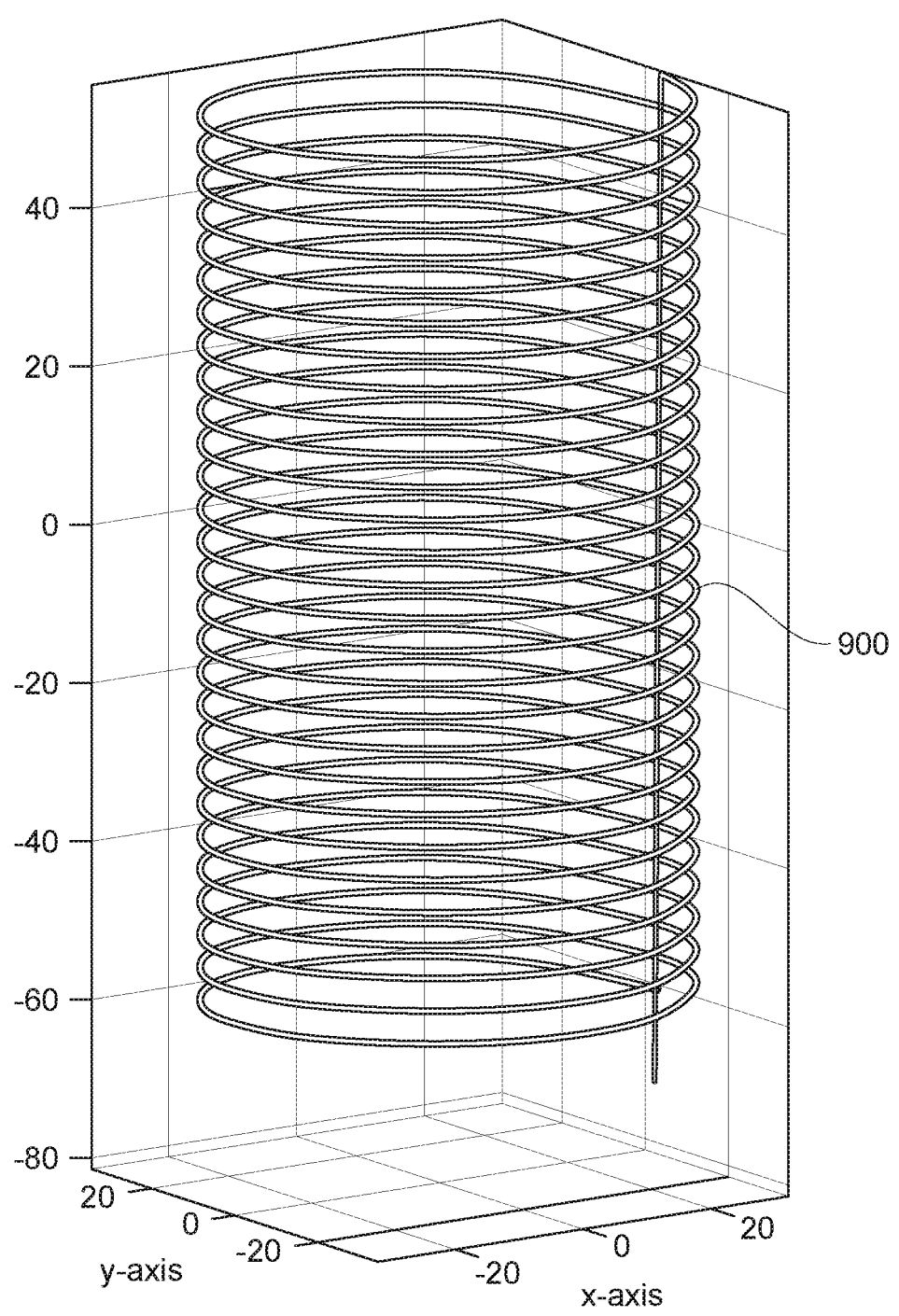
FIG. 9 depicts a spiral wound coil for heating containers, packages, or vessels according to one embodiment of the present disclosure.

FIG. 9 shows a spiral wound coil 900 for heating containers, packages, or vessels. The coil 900 can be a variety of sizes and the wire size and type used to create the coil can vary based on the design needs of the system. The coil 900 may also be designed to have a certain equivalent series resistance ("ESR"). The coil 900 may be validated by a testing or calibration process. The operating point(s) for the coil can be selected, tested, and adjusted to provide suitable inductive field output at particular power levels and positions depending on how the coil is energized, and with how much energy the coil is energized. Taps may be included for various height or length packages and automated configuration of the proper field to heating configuration. The taps allow the system to select how many and which portions of the coil to use for a particular container, package, or vessel.

Figure 10:
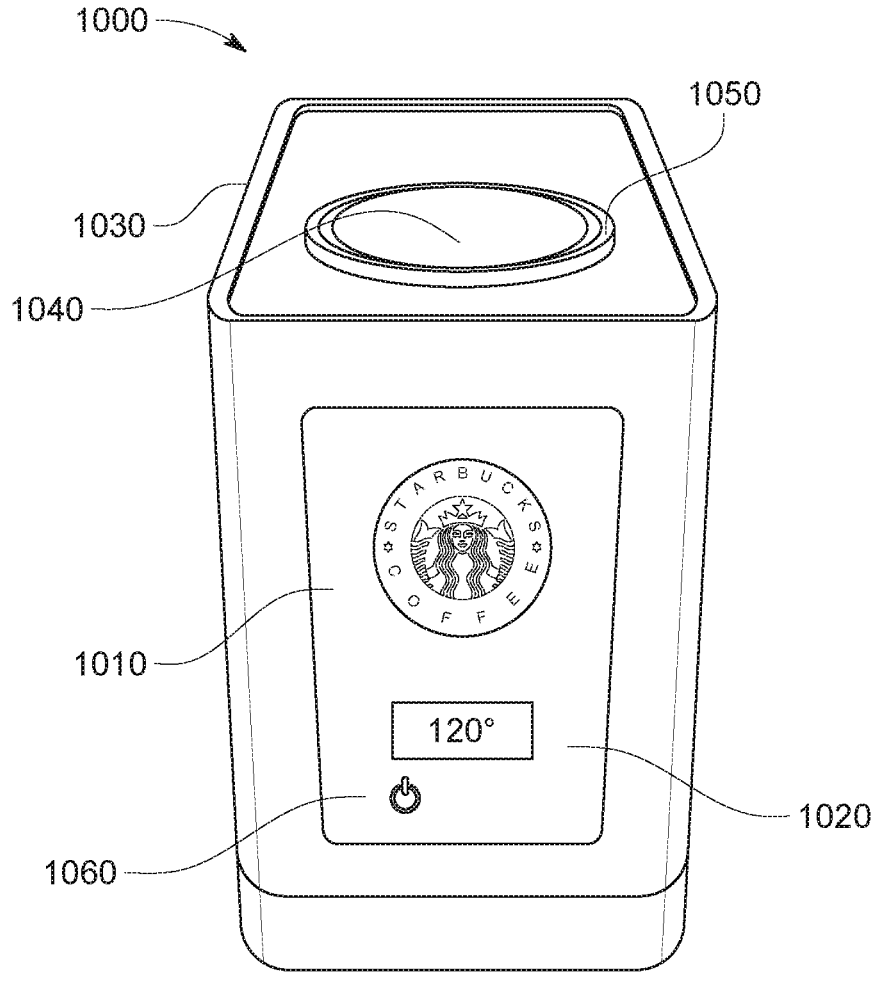
FIG. 10 shows a container or package heating appliance with a display.

FIG. 10 depicts a container or package specific appliance 1000 with a marketing and feedback display 1010 and temperature control 1020 in accordance with one embodiment. The marketing and feedback display 1010 can display a logo or can provide a mechanism for user feedback. The depicted embodiment has a top blended surface 1030 with a cavity 1040. In one embodiment, the cavity 1040 is silver. A heating/active light ring 1050 surrounds the opening of cavity 1040. In one embodiment, the heating/active light ring 1050 may up different colors to inform the user of what the appliance is doing. For example, the heating/active light ring 1050 may light up blue to show the system is ready to accept a container, package, or vessel; may light up red to show the appliance is currently heating the container and to warn the user not to touch the package; and may light up green to inform the user that the container is ready to be removed. The appliance also has a power control 1060 to turn the appliance on and off. It should be noted that this device can be square, round, or multiple shapes, and sized for various containers, packages, or vessels.

FIG. 11 shows an appliance 1110 to allow exposed area for various sized containers or packages while allowing easy access according to one embodiment. An 8 ounce can is 1 inch taller than a 6 ounce can. An 8 ounce can 1120 is shown disposed in an appliance 1100 and the appliance 1110. The appliance 1100 conceals most of an 8 ounce can but fully conceals a 6 ounce can. This makes it more difficult for the user to access the 6 ounce can. In contrast, the appliance 1110 conceals most of a 6 ounce can but leaves more of the 8 ounce can exposed. This allows the user to easily access either an 8 ounce can or a 6 ounce can after it is disposed in the appliance 1110.

Figure 12:
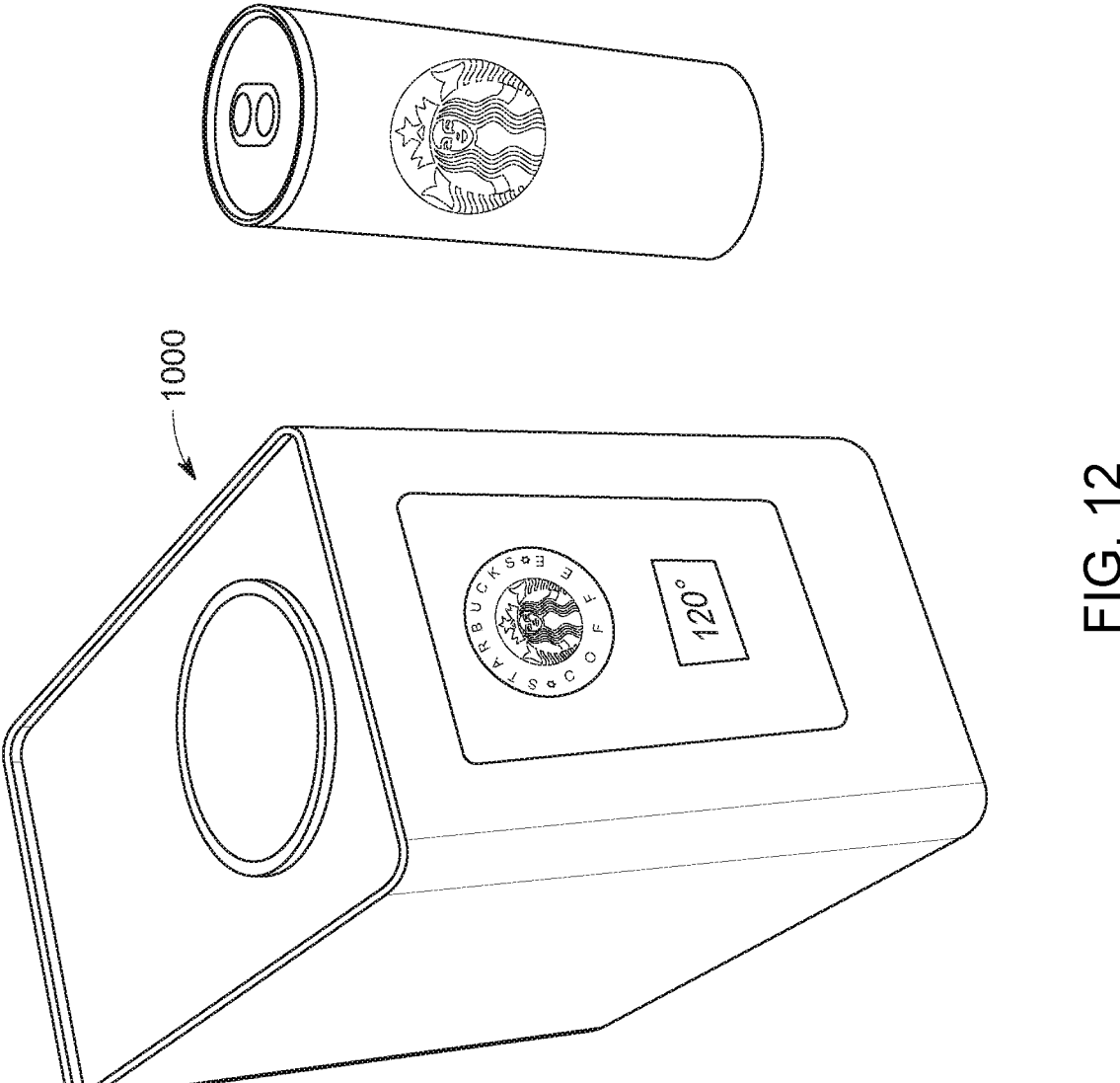
FIG. 12 shows a top perspective view of the appliance of FIG. 10.

FIG. 12 shows a top perspective view of the appliance 1000 of FIG. 10.

Figure 13:
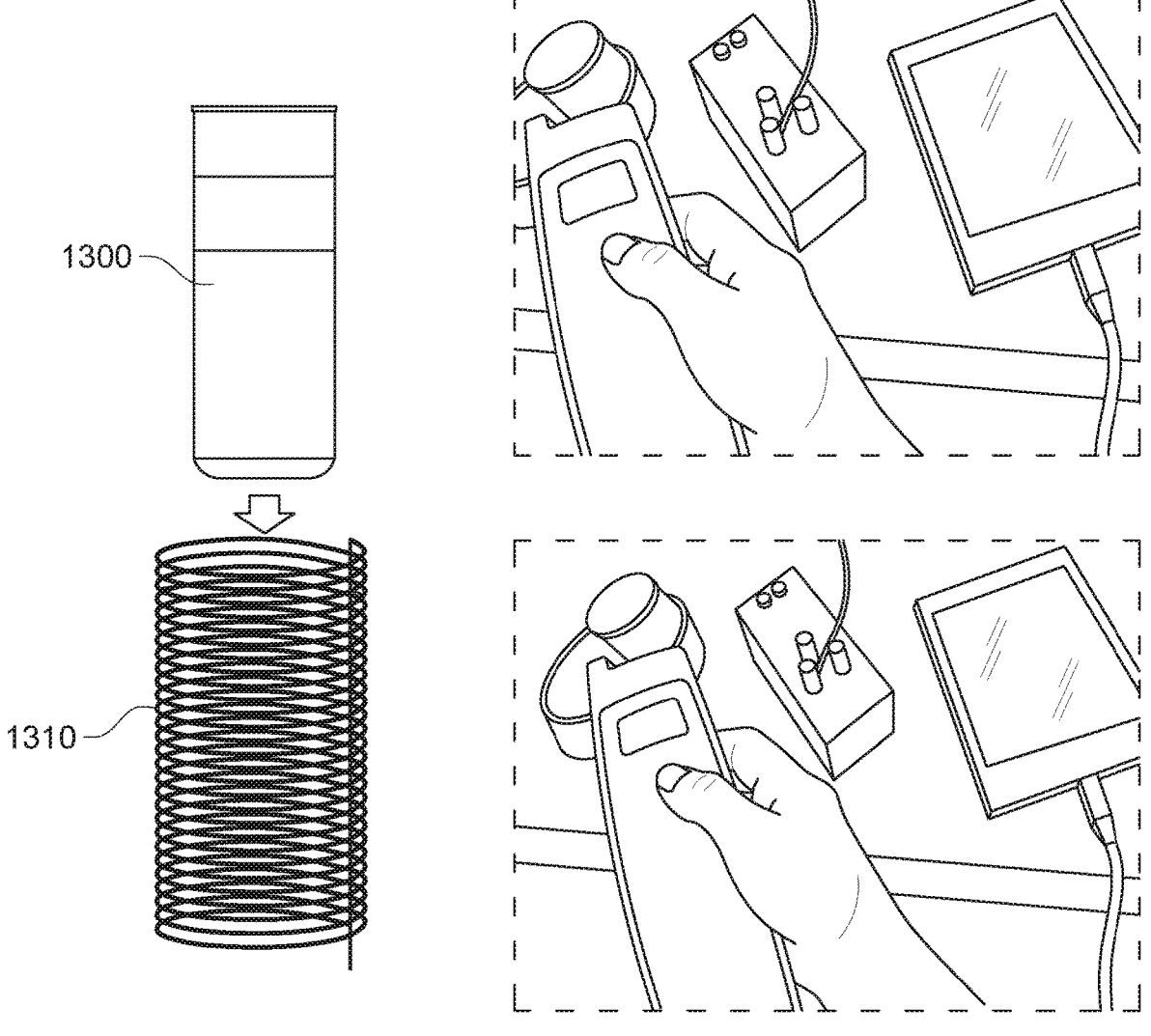
FIG. 13 shows a representative view container being placed into a spiral wound coil for interval temperature measurements for fast heating.

FIG. 13 illustrates a container 1300 being placed into a spiral wound coil 1310 and measurements being taken at intervals for fast heating. As depicted, the measurements are being taken using a non-contact IR sensor. The appliance can take multiple temperature readings throughout the heating process to ensure the container is heating as expected. The starting temperature for an average can before heating is between 77 and 80 degrees Fahrenheit. The total container 1300 is equilibrated to the starting temperature. The target heating for container 1300 is to take 30 seconds to go from 77 degrees Fahrenheit to 131 degrees Fahrenheit. The measured temperature of container 1300 varies dramatically from the top, mid-point, and bottom of the container. For example, when the top of the container 1300 is measured to be 132 degrees Fahrenheit, the mid-point of the container 1300 is measured to be 154 degrees Fahrenheit.

FIG. 14 shows a heating system 1400 using a controller 1410 with an RFID or P-Chip reading 1402, an infrared sensor 1404, and a driver 1424 (e.g., a pulse-width modulation driver) with phase, frequency, and duty cycle control according to one embodiment. The controller 1410 receives an ambient temperature 1432 and interfaces with a voltage sensor 1434 and a current sensor 1436. The voltage sensor 1434 and the current sensor 1436 are connected to a power supply 1438. The heating system 1400 uses a camera 1406 for barcode and image recognition. The heating system 1400 has multiple tap switches 1408 for various size containers, packages, or vessels 1412. The tap switches 1408 allow the heating system to use some parts or all of a coil 1430 depending on the heating needs of the container, package, or vessel 1412. The heating system 1400 monitors a coil temperature 1414 for safety considerations. The heating system 1400 can communicate using BTLE and/or WiFi 1416 for mobile and cloud Internet of things ("IOT") interface 1418. The heating system 1400 can have a unique identifier for safe over-the-air ("OTA") and IOT communications. A display and capacitive touch driver 1420 operates an appliance 1422, but also doubles as a marketing content device and feedback collection input for marketing and surveys. A selectable half or full bridge driver 1424 allows for easy configuration of multiple mains input voltage and allows a selectable field when needed. An identifier on the container, package, or vessel 1412 tells the system to pull a configuration data from the cloud to enable proper heating parameters for that container, package, or vessel.

In one embodiment, the system utilizes imaging, infrared, and barcode or RFID to determine and control the power supplied to a container or package. A concern in this area is how to identify, authenticate, and heat packages without increasing the cost of the package. By using an infrared sensor combined with an identifier (for example, bar code and/or image recognition), the system can use that identifier to look up the preset configuration associated with that identifier. The container or package identifier can provide the system the safe power for the package, and operational parameters like frequency range, phase, duty cycle for control options, and areas of operation. Power and thermal profiles for the container or package with any device can be saved to the cloud so that they can be played back (e.g., implemented by a controller in the heating device of the present disclosure) as the consumer package company desires. When powered, the IR thermal profile needs to match the safety data for that identifier. If the thermal profile matches the safety data, the system will continue to heat the package. If the thermal profile is not as expected, the system can check the cloud data to see if it contains disposition data. Examples of disposition data include instructions such as heat slower, stop, ask for feedback on volume (for example, "Did you drink half of this? Yes/No"). This gives the system many opportunities to validate the identifier. For example, the disposition data can be cross referenced with the specific temperature sensor readings obtained by the IR temperature sensor or other specific sensor, e.g., another temperature sensor.

Figure 15:
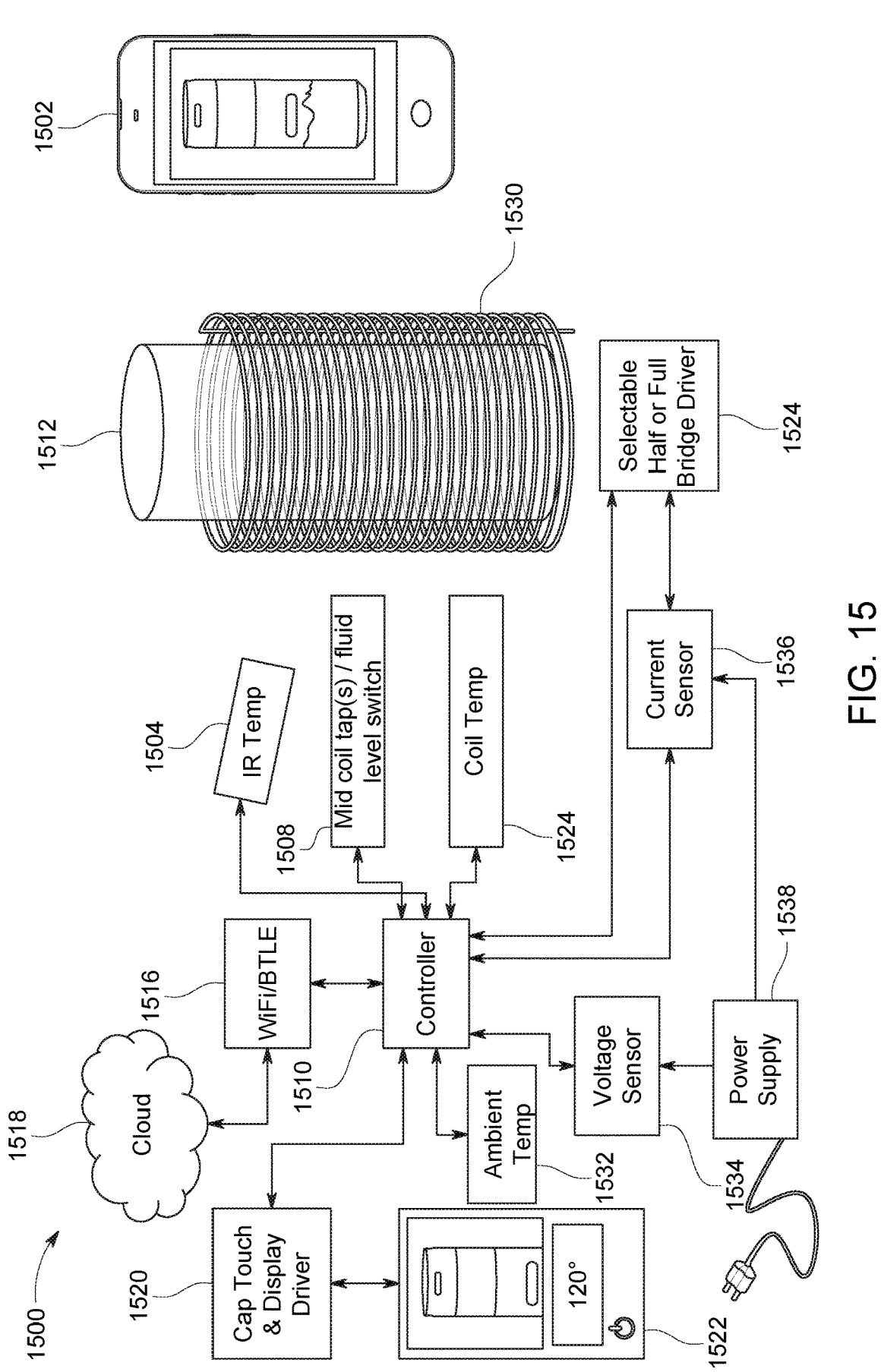
FIG. 15 shows the heating system of FIG. 14 but using the mobile device for the image capture and using the Bluetooth Low Energy ("BTLE") or WiFi as the interconnection along with the unique identifier to assure safe and specific device communications.

FIG. 15 shows another embodiment of a heating system 1500. The heating system 1500 uses a controller 1510 connected to an IR sensor 1504. The controller 1510 receives an ambient temperature 1532 and interfaces with a voltage sensor 1534 and a current sensor 1536. The voltage sensor 1534 and the current sensor 1536 are connected to a power supply 1538. The heating system 1500 uses a mobile device 1502 to capture the image of a package identifier and uses the BTLE or WiFi 1516 to connect the mobile device 1502 to the heating system 1500. The heating system 1500 has a unique identifier to ensure safe and device specific OTA and IOT communications. The heating system 1500 has multiple tap switches 1508 for various size containers, packages, or vessels 1512. The tap switches 1508 allow the heating system to use some parts or all of a coil 1530 depending on the heating needs of the container, package, or vessel 1512. The system monitors a coil temperature 1514 for safety considerations. The system also uses BTLE and/or WiFi 1516 to communicate with cloud IOT interface 1518. A display and capacitive touch driver 1520 operates an appliance 1522, but also doubles as a marketing content device and feedback collection input for marketing and surveys. A selectable half or full bridge driver 1524 allows for easy configuration of multiple mains input voltage and allows a selectable field when needed. An identifier on the container, package, or vessel 1512 tells the system to pull a configuration data from the cloud to enable proper heating parameters for that container, package, or vessel.

In one embodiment, the appliance can utilize mobile imaging and IR to determine and control power to a container or package based on interface. Mobile devices are now used to perform many tasks. A lower cost system can be provided if the user scans the product and the identifier is authenticated as a secondary measure. The mobile device can take the picture while the product is on or in the appliance, and the system then monitors the inductive profile for the container or package removal and range of match. Then, temperature trajectory and heating rate are used as a secondary authentication. The mobile device can be connected to the heating system via BTLE, WiFi, or any other communications means. The appliance unique identifier keeps mobile devices and other appliances from misidentifying it.

Figure 16:
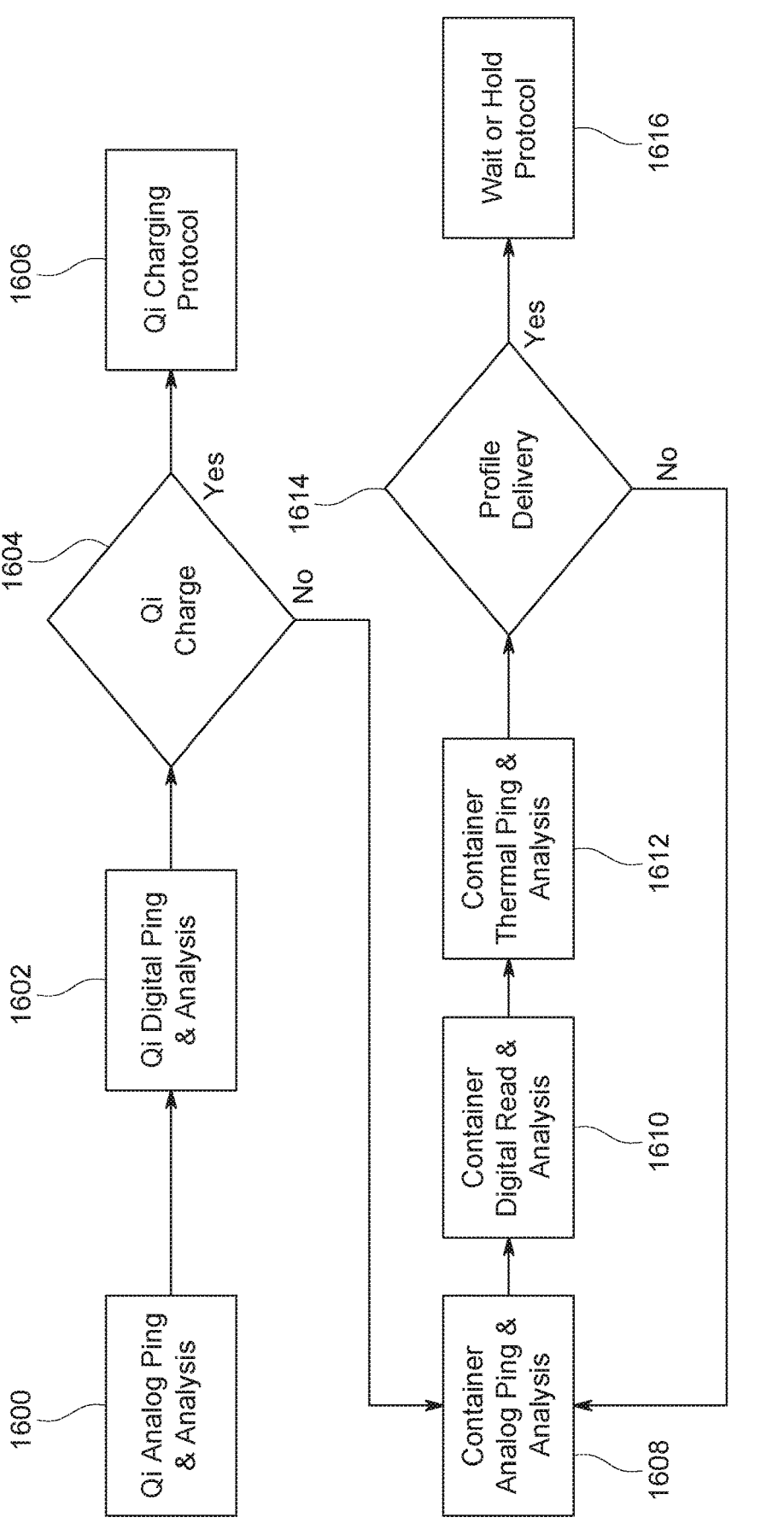
FIG. 16 shows a representative flowchart of Qi charging and container heating.

In FIG. 16, a method of determining whether to use a Qi charging protocol 1606 or a container heating protocol 1616 (e.g., a wait, or hold heating protocol) is shown. The method uses analog and digital pings. Analog pings 1600, 1608 are off resonance and selected to detect a product but not expected to power the product. Digital pings for Qi 1602 and digital read for containers 1610 are used to read information from the product. Alternatively, reading information from the product can be done through imaging and image processing and recognition solutions. On the container side, a heating system pings the container 1612 to validate that something is present. The heating system then attempts to read or recognize the product 1614. At this point the analog ping detains of power and impedance needs to match the ID related information. Upon obtaining the package information validated, the system again seeks validation by issuing a thermal ping 1612. The thermal ping 1612 contains a set of data. For example, the set of data may include a target frequency, an expected power range, a maximum power range, whether a consumer preference offset is allowed (user selectable limits), safety limits, and/or a temperature profile for several probes (package, surface(s), ambient). This method repeats itself until the product is heated to the target temperature while meeting the expected profile. If the product is removed, the system detects the removal and offers options based on triggers, such as reheating, warming, etc. A wide variety of options are enabled in software for how the heating system may engage the user throughout this process.

In one embodiment, the system uses an analog ping, a digital read, and a thermal ping to authenticate and control a package thermal and power profile. There is an analog ping for containers, much like the Qi system, but the analog ping seeks to differentiate resonant self-consumption versus system resonance. When operating close to resonance it becomes more difficult to validate the presence of the system components. The analog ping validates the presence of the package, while the digital read validates the identity of the package. This identification may include image, barcode, 2D code, and/or RFID of mobile camera reader. The identification incorporates or references the analog ping profile to validate the range of the product. Once the analog ping and digital read have identified the container, the system starts the heating process. The target operating parameters are loaded based on information from the digital read. The next step is another validation process by applying that predetermined power. The validation is checking power and temperature over a predetermined period of time, which is called a thermal ping. The thermal ping is defined by the predetermined amount of power for a predetermined period of time that impacts measurable temperature within that time. The temperature feedback is a surface temperature(s), a tag temperature if acceptable, and/or an infrared ("IR") non-contact container temperature. If the package temperature is not a tag, then the system looks to the external IR non-contact container temperature. In one embodiment, the tag may just provide identification. In other examples, the package identification device is an imaging device with an imaging processor to identify the image and reference the operating parameters. Between each thermal ping the system rechecks temperature, power, impedance, and thermal trajectory.

Figure 17:
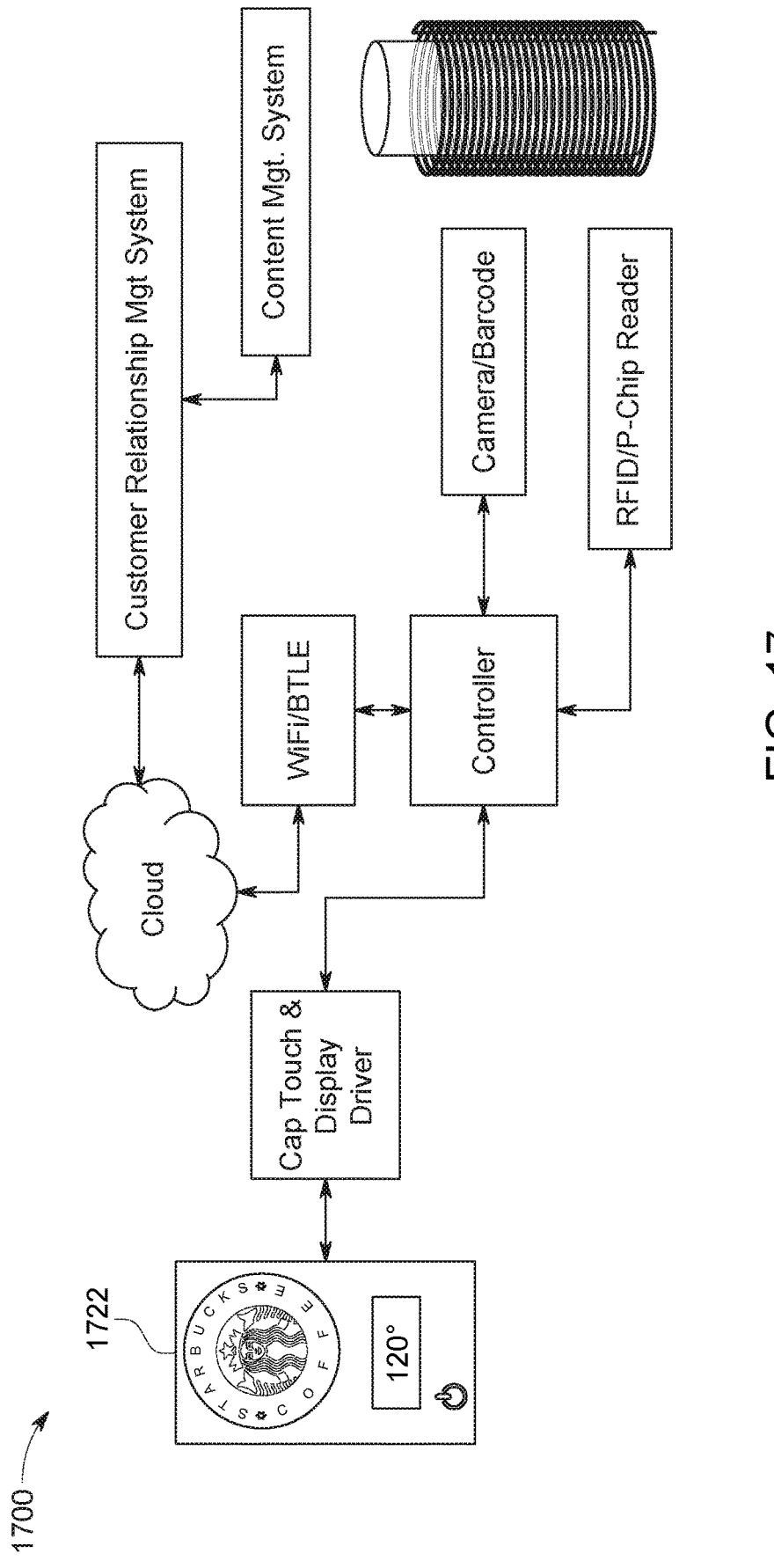
FIG. 17 shows a system and method for sharing customer relationship management ("CRM") and marketing content via preset subscriptions from a manufacturer and mediated by a user profile as to level of consumption and feedback.

FIG. 17 shows a system and method for sharing customer relationship management ("CRM") and marketing content 1700 via preset subscriptions from the manufacturer and mediated by the user profile as to the level of consumption and feedback according to one embodiment. An appliance 1722 may be used to display customer content and/or advertising. In this way, the appliance 1722 can be used as an advertising presentation system and survey collection device. Any indicators and what is displayed while heating can be brand driven.

Figure 18:
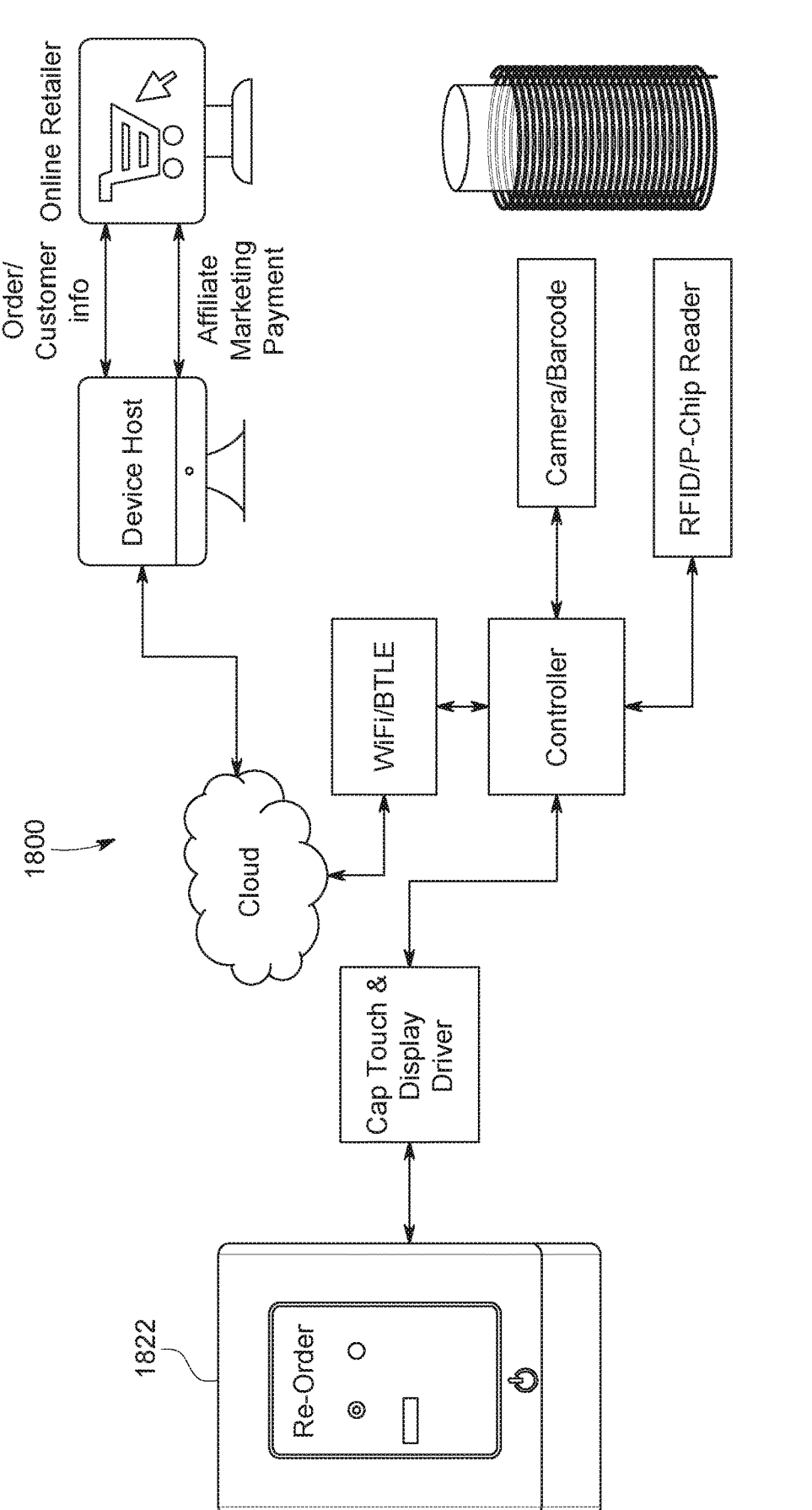
FIG. 18 depicts an optional mobile device interface for content and CRM management as well as feedback.

FIGS. 15 and 18 depict an optional mobile device interface for content and CRM as well as feedback. This is one embodiment of a customer purchase/affiliate marketing methodology 1800. An appliance 1822 according to one embodiment can be used to re-order containers, packages, or vessels.

In one embodiment, the system is using a package ID and cloud marketing network to enable content and marketing data to be used while heating and during consumption. In FIGS. 10-12, the appliance shown can utilize the package ID of the container to connect content to the user. This can be via a mobile device or an appliance display with a portion selectable and a portion to be driven by the subscription of the container or package company. The subscription drives the content via the cloud to the appliance and the mobile display. The content management system can be varied by SKU or category type. Loyalty points and CRM can also be managed and applied through the content management system. The same system can also provide means to online retailers as driven by subscriptions and advertising dollars. The system manages these fees and drives content, loyalty, and CRM content and time for each container or package ID as paid for by that manufacturer. The system becomes a tool to interface with these customers at the point of consumption. Questions and feedback can be pushed and monitored or managed through this same channel. The CRM profile allows the user to also configure the role they wish to play. They may be a super user and want to drive product feedback or they may want to be removed from feedback. Loyalty and offers can also be used to drive feedback rewards.

In one embodiment, the system utilizes point of consumption triggers for marketing and feedback. Specific triggers are used for initiating notifications, interactions, videos, sounds, media, offerings, advertising, and feedback requests. A non-limiting series of these triggers and response opportunities is listed below. Upon placing a product on an appliance for heating, the system may make a request to the user, for example, "What temperature would you like your steak?" Additionally or alternatively, the system may send or display a notification to the user, for example, "Thank you for buying x, attached is a coupon for y" or "Do you want to be notified when heating is completed?" Upon placing a partially used product on an appliance for heating, the system may send or display a notification to the user, for example, "This product is partially used, warm, or reheat?" If the system goes partially through a heating cycle and the product is removed before the heating cycle is complete, the system may create a product log, for example, "ID x was partially cooked." Additionally or alternatively, the system may send or display a notification to the user, for example, "This product is not fully cooked, heating cycle was interrupted." After completing a heating cycle, the system may make a request to the user, for example, "Would you like to keep this container warm now?" Additionally or alternatively, the system may send or display a notification to the user, for example, "Thank you for trying x." After the user removes the product after completion of a heating cycle, the system may send or display a notification to the user, for example, "Thank you for your loyalty. You have x loyalty points," "Other people like x," or "You are low on x. Would you like to order more." After the user removes a product and after a set time after which the product should be consumed, the system may send or display a notification to the user, for example, "You tried our cheesy mac-n-cheese, was it cheesy enough? (1-10, Yes=10 No=1)," or "Did you enjoy our product? Please rank your experience."

Figure 19A:
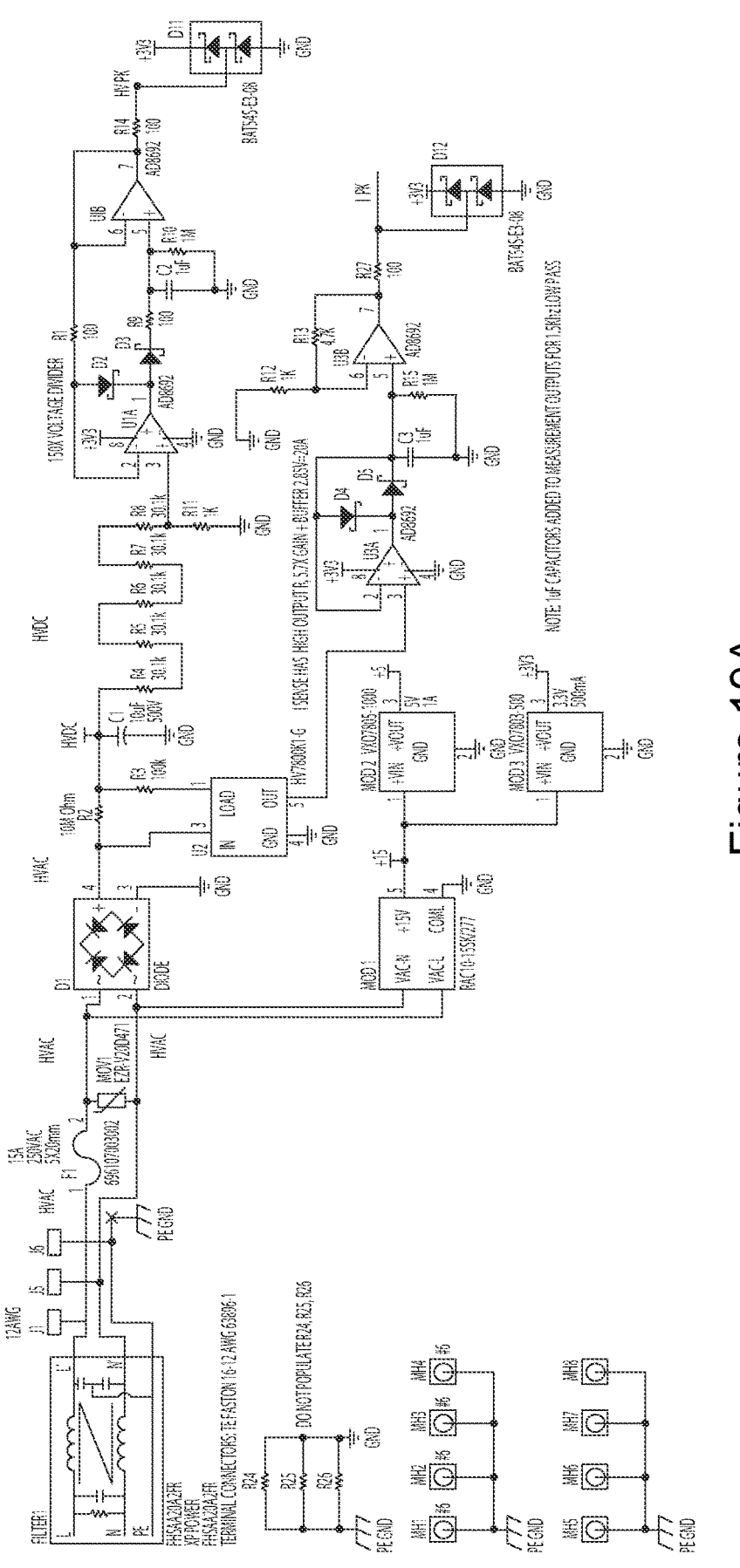
FIGS. 19A-B show the schematic for an input power system for a high power appliance according to one embodiment.
Figure 19B:
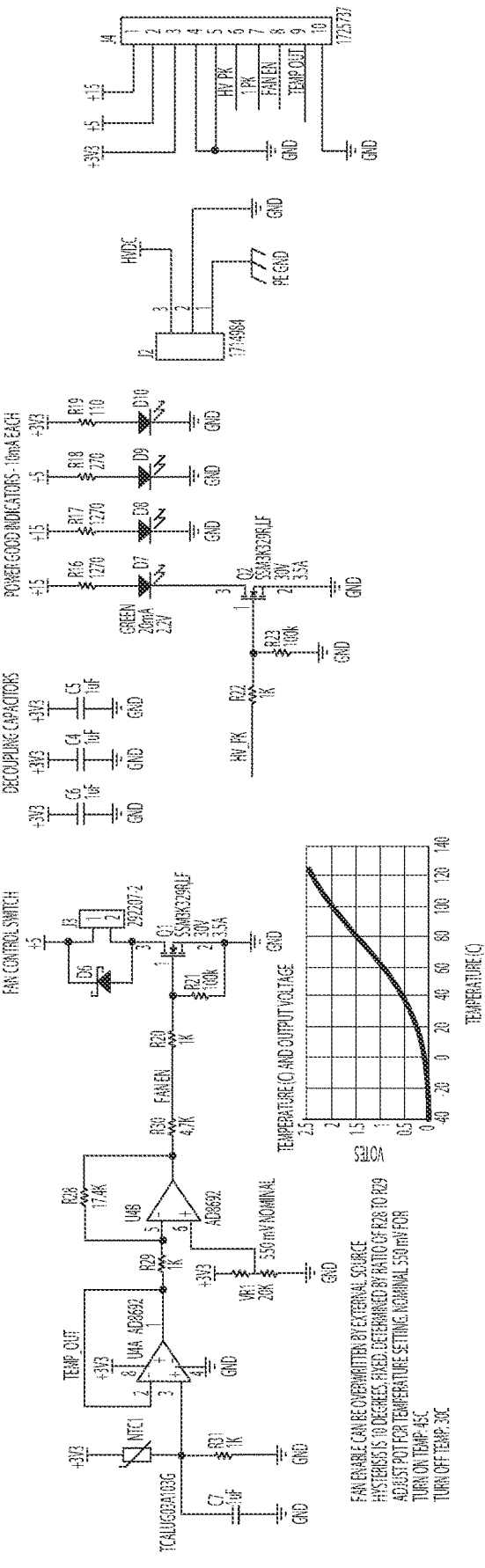

FIGS. 19A-B depict the schematic 1900 for an input power system for a high power appliance according to one embodiment.

Figure 20:
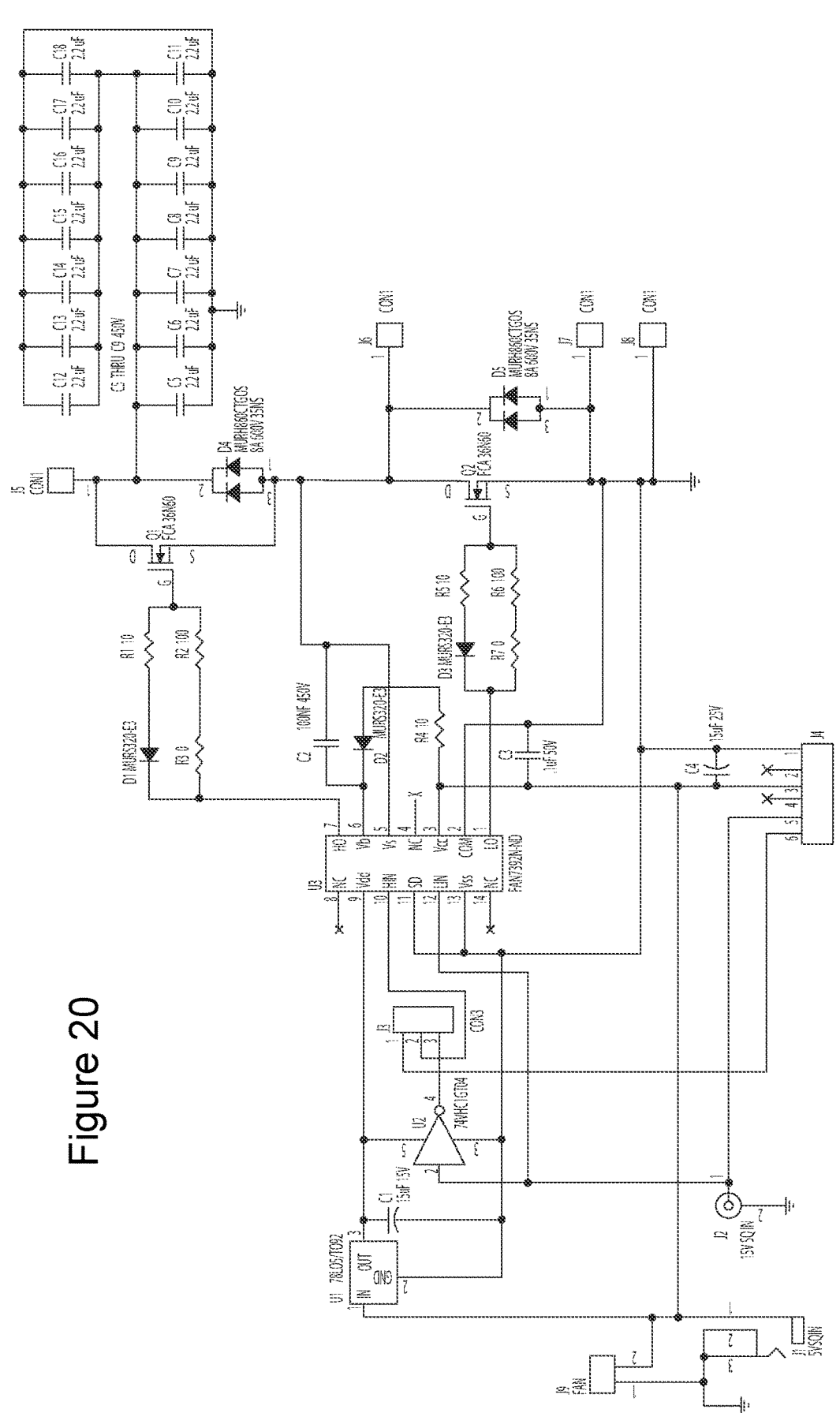
FIG. 20 shows a half bridge controller.

FIG. 20 shows an embodiment of a half bridge controller. In one embodiment, two half bridge controllers are used for full bridge drive. In one embodiment, a half-bridge driver 2010 is an ON Semiconductor® FAN7392N-ND half-bridge driver.

Figure 21:
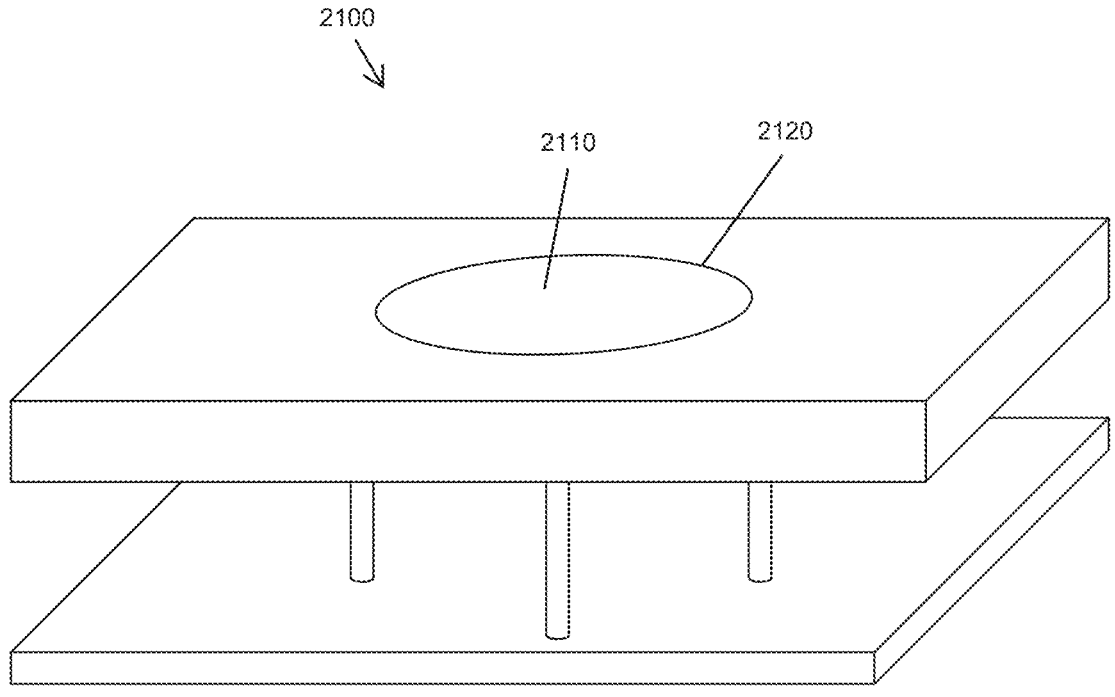
FIG. 21 shows a heating device according to one embodiment.

FIG. 21 shows a heating device 2100 according to one embodiment. The heating device 2100 has a surface coil 2110 with a plunger inset 2120 for enabling the heating of multiple container, package, or vessel types.

Figure 22:
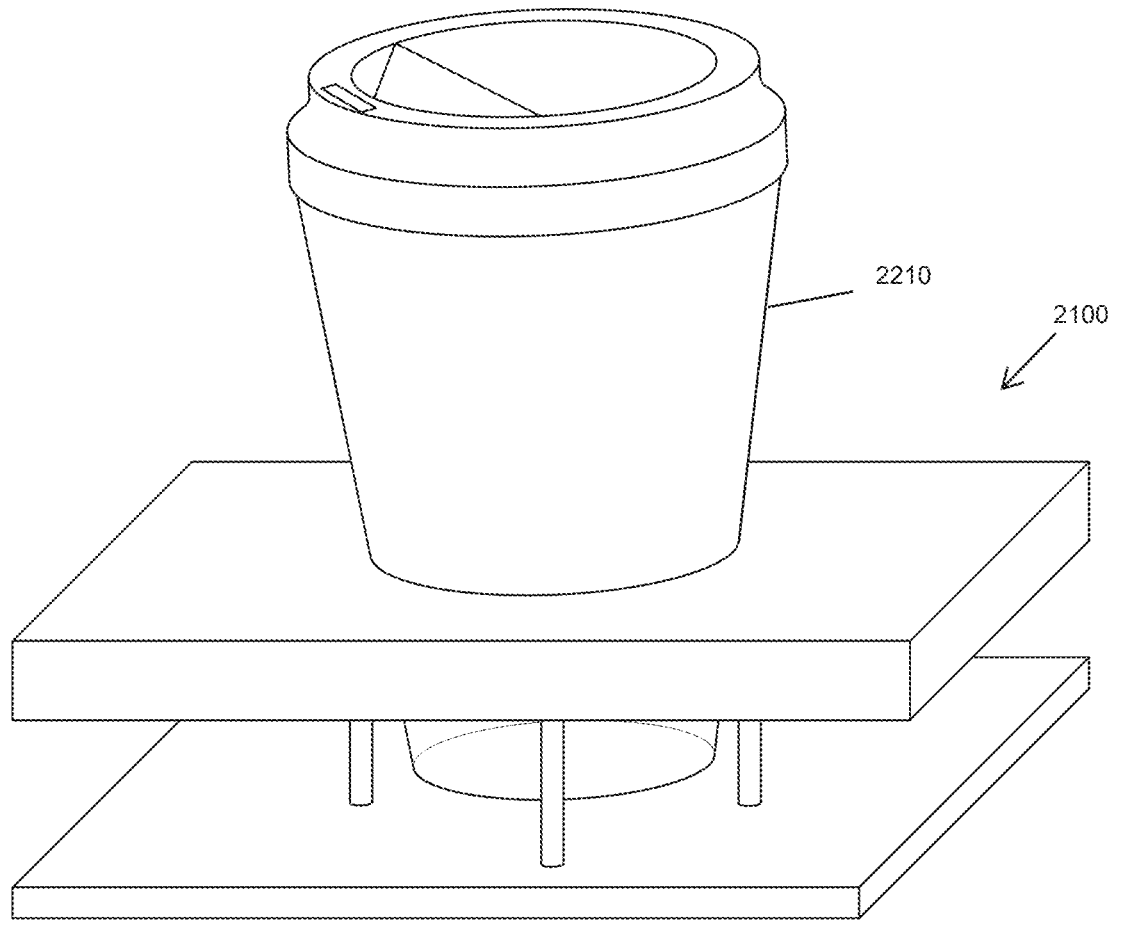
FIG. 22 depicts the heating device of FIG. 21 with a container, package, or vessel.

FIG. 22 shows an example of the heating device 2100 of FIG. 21 with the plunger inset 2120 being depressed by a container, package, or vessel 2210. The weight of the container, package, or vessel 2210 determines how far the plunger inset 2120 is depressed. In one embodiment, the weight of the container, package, or vessel 2210 can be used to determine how much power needs to be applied to the container, package, or vessel 2210 in order to heat it to an appropriate temperature.

Figure 23:
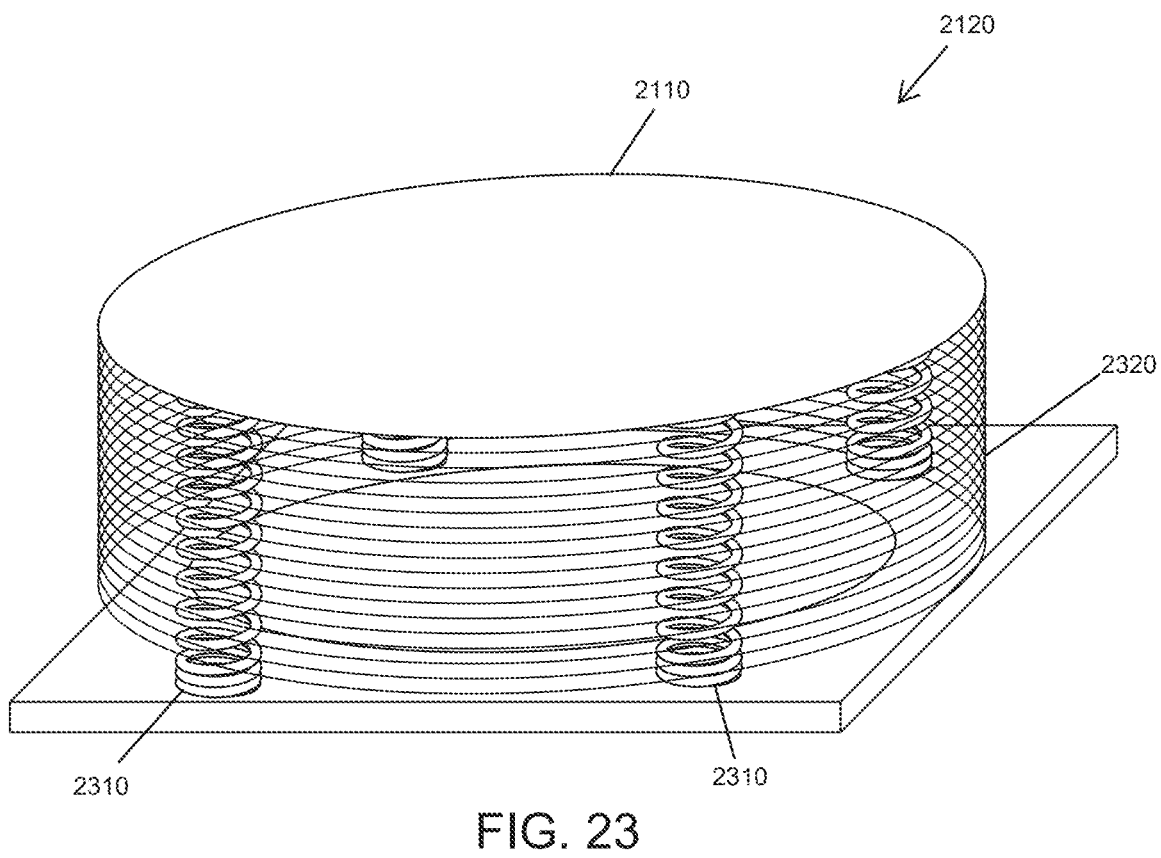
FIG. 23 depicts another embodiment of a plunger of the heating device of FIG. 21.

In FIG. 23, another embodiment of the plunger inset 2120 of the heating device 2100 of FIG. 21 is shown. The plunger inset 2120 is shown as a planar coil 2110 using the springs 2310 and the coil leads while surrounding the plunger inset 2120 with a spiral wound cylindrical coil 2320 when depressed.

Various embodiments of this disclosure provide the proper power to many package types and materials from multiple types of inductive heating coils. Using various coil sizes and configurations allows for the consistent heating of various packages or containers of different sizes, configurations, and types. In some embodiments, an induction hob with 8 inch coils provides the proper power to a container or package in a limited and safe way for the package type. In addition, an appliance may be made specifically with a coil designed for the particular container or package to provide power to the package for optimal fast heating. A portable heating pad can also or alternatively be used to heat the same container or package, but it will apply less power and potentially take longer. The container and package safety thresholds along with the identification and authentication process enables each inductive coil and driver system to provide the proper power within safety limits for the container or package while validating the thermodynamic profile for that container or package. The inductive coil and drive can then bring that package to temperature in the appropriate time, using the appropriate power, while validating the package by monitoring the safety limits and how the applied power is converted to heat. Additionally, the container or package can be moved from one inductive heating appliance to another within an ecosystem, for example to provide different amounts or configurations of heating/power.

In one embodiment, the system can determine and control a power of a multi-segment coil based on a fluid level in the container or package. The system uses an identifier or RFID of a package to gather the thermal profile data of a container or package. The system also gathers the range of power allowed over time to get to the target temperature. Based on temperature trajectory and power, the system then determines the rate of heating. The system compares the rate of change to a table of volumes to determine the volume of the container or package. The system uses the volume to change the coil area to be less than the volumetric area and not overlapping. This allows the system to heat sealed packages without creating super heating or building pressure. If the package or container includes fluids or thermally conductive materials, the thermal dynamics can be configured to equilibrate the mass over the time to temp.

In one embodiment, the system has adjustable coil(s) and a moving container or package interface. FIGS. 21-23 depict an exemplary solution that has a planar coil on a flat surface but can become a cylindrical coil when a container, package, or vessel is placed in the center. Springs that are also the planar connections compress revealing the additional cylindrical spiral wound coil which enables several choices for heating area and inductances. This solution can also allow package heating and cell phone charging using several types of containers, packages, and vessels.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A heating system for inductive heating a container, the system comprising:
an infrared non-contact temperature sensor configured to detect temperature of the container;
a first sensor for obtaining a first identifier of the container;
a second sensor for obtaining a second identifier of the container;
an inductive heating coil;
a communications module configured to transmit at least one of the first identifier of the container and the second identifier of the container and configured to receive communication relating to an appliance and container configuration; and
a heating controller configured to dynamically control inductive power applied to the inductive heating coil such that an actual heating performance of the container during inductive heating remains consistent with an expected heating performance of the container during inductive heating in accordance with the appliance and container configuration,
wherein the infrared non-contact temperature sensor is positioned toward the container at an inclined angle from a virtual center line perpendicular to a surface of the container,
wherein at least one of the first identifier and the second identifier includes a thermodynamic profile of the container, and
wherein the heating controller is configured to dynamically control inductive power applied to the inductive heating coil in accordance with the thermodynamic profile included in the at least one of the first identifier and the second identifier, the thermodynamic profile being a profile curve of power over frequency for different appliance and container configurations.

2. The system of claim 1 including a heating system interface, the heating system interface including a display for displaying content and an input device for collecting feedback from a user.

3. The system of claim 1 wherein the heating controller is configured to control inductive power applied to the inductive heating coil to decrease time to target temperature for the container.

4. The system of claim 3 wherein the heating controller is configured to decrease time to target temperature for the container by adjusting the power level applied to the inductive coil in response to the infrared non-contact temperature sensor readings.

5. The system of claim 3 wherein the heating controller is configured to decrease time to target temperature for the container by controlling the inductive power applied to the inductive heating coil according to a control curve, the control curve including a relationship between expected power levels related to temperature for the appliance and container configuration.

6. The system of claim 3 wherein the heating controller is configured to decrease time to target temperature for the container by adjusting a means to at least one of expected power and temperature.

7. A dynamic power appliance comprising:
a temperature sensor configured to obtain container temperature sensor measurements of a container;
an inductive heating coil; and
a heating controller,
wherein the inductive heating coil is configured to be physically adjustable in length and shape in accordance with container type and to be adjustable in power in accordance with container type, and
wherein the temperature sensor obtains the container temperature sensor measurements of the container at an angle offset from a position perpendicular to the container, and
wherein the container is movable and the inductive heating coil is configured to be physically adjustable between a planar coil and a cylindrical coil in accordance with container type.

8. The dynamic power appliance of claim 7 wherein the heating controller is configured for analog ping, a digital read, and a thermal ping to authenticate and control a package thermal and power profile.

9. The dynamic power appliance of claim 7 wherein the controller is configured to use container temperature sensor measurements, identification, and thermodynamic profile to control and limit power and authenticate package and usage.

10. The dynamic power appliance of claim 7 wherein the controller is configured with point of consumption triggers for marketing and feedback.

11. The dynamic power appliance of claim 7 wherein the inductive heating coil is a multi-segment coil and wherein the heating controller is configured to control power to the multi-segment coil based on fluid levels in the container.

12. The dynamic power appliance of claim 7 wherein the heating controller operates according to a safe operating profile related to container volume.

13. The dynamic power appliance of claim 7 wherein the heating controller operates according to a volumetric-based operating profile that adjusts power applied to the inductive heating coil based on the amount of volumetric status of the container.

14. The dynamic power appliance of claim 7 wherein the dynamic power appliance is in communication with a cloud marketing network to enable content and marketing data based on the container ID for use during operation.

15. The dynamic power appliance of claim 7 wherein the heating controller is configured to utilize imaging, infrared, and barcode or RFID to determine and control power to the container.

16. The dynamic power appliance of claim 7 wherein the heating controller is configured to communicate with a mobile imaging and infrared system to determine and control power to the container.

17. The dynamic power appliance of claim 7 wherein the heating controller is configured to dynamically adjust power applied to the inductive heating coil according to the container type.

* * * * *